United States Patent [19]

Kawachi et al.

[11] Patent Number: 5,044,715

[45] Date of Patent: Sep. 3, 1991

[54] GUIDED-WAVE OPTICAL BRANCHING COMPONENTS AND OPTICAL SWITCHES

[75] Inventors: Masao Kawachi; Kaname Jinguji, both of Mito; Norio Takato, Katsuta; Akihiro Takagi, Mito, all of Japan

[73] Assignee: Nippon Telegraph and Telephone Corporation, Tokyo, Japan

[21] Appl. No.: 475,435

[22] Filed: Feb. 5, 1990

[30] Foreign Application Priority Data

| Feb. 7, 1989 | [JP] | Japan | 1-26542 |
| Mar. 7, 1989 | [JP] | Japan | 1-52866 |
| Jul. 7, 1989 | [JP] | Japan | 1-174072 |
| Sep. 4, 1989 | [JP] | Japan | 1-227449 |

[51] Int. Cl.$^5$ .......................... G02B 6/26; G02B 6/12
[52] U.S. Cl. .......................... 385/42; 385/14; 385/16
[58] Field of Search ............... 350/96.11, 96.12, 96.13, 350/96.14, 96.15, 96.16, 96.20; 356/349, 350

[56] References Cited

U.S. PATENT DOCUMENTS

| 4,669,816 | 6/1987 | Thompson | 350/96.15 |
| 4,768,850 | 9/1988 | Moslehi et al. | 350/96.15 |
| 4,834,481 | 5/1989 | Lawson et al. | 350/96.15 |
| 4,900,112 | 2/1990 | Kawachi et al. | 350/96.12 |
| 4,900,119 | 2/1990 | Hill et al. | 350/96.15 |
| 4,976,512 | 12/1990 | Safaai-Jazi | 350/96.15 X |
| 4,979,790 | 12/1990 | Walker | 350/96.15 |

FOREIGN PATENT DOCUMENTS

| 63-501527 | 6/1988 | Japan | 305/96.15 X |
| 00934 | 2/1987 | PCT Int'l Appl. | 350/96.15 X |
| 00616 | 12/1989 | PCT Int'l Appl. | 350/96.16 X |

OTHER PUBLICATIONS

Takato et al.–"Silica-Based Single-Mode Waveguides on Silicon and Their Application to Guided-Wave Optical Interferometers", Journal of Light Wave Technology vol. 6, No. 6, Jun. 1988.

*Primary Examiner*—Brian Healy
*Attorney, Agent, or Firm*—Spencer & Frank

[57] ABSTRACT

A guided-wave optical branching component is composed of a Mach-Zehnder interferometer having two or more directional couplers. A slight difference $\Delta L$ in the optical-path length is provided in two or more optical waveguides connecting the two or more directional couplers. The difference of the optical-path length is less than the shortest wavelength in the operational wavelength region of the guided-wave optical branching component, and the coupling ratio of each of the two directional couplers monotonically increases with wavelength in the operational wavelength region. By using the optical branching components thus constructed (i.e., Mach-Zehnder interferometer type 3-dB optical coupler) in conjunction with a phase shifter, a Mach-Zehnder interferometer type optical switch can be achieved.

18 Claims, 30 Drawing Sheets

GUIDED-WAVE OPTICAL BRANCHING COMPONENTS AND OPTICAL SWITCHES

BACKGROUND OF THE INVENTION

1. Field of the Invention

The present invention relates to guided-wave optical branching components and guided-wave optical switches which are preferably used in the optical communication field. More specifically, the present invention relates to guided-wave optical branching components wherein the wavelength dependence of the power coupling ratio is reduced, and further relates to guided-wave optical switches which can switch optical signals in a wide wavelength region with reduced wavelength dependence.

2. Description of the Prior Art

For development of optical fiber communications, the development of various optical circuit components such as optical branching/combining components, optical multiplexers/demultiplexers, optical switches, and the like, is essential in addition to the fabrication of optical fibers, photodetectors, and light emitting devices of high quality and low cost. Above all, optical branching components are the most basic optical component: optical branching components having various branching ratios (coupling ratios) such as 50 percent, 20 percent, or a few percent are required. In particular, optical branching components of little wavelength dependence in a wide wavelength region are earnestly required.

Optical branching components are also called optical couplers, and are classified as the following three types: (1) bulk-type branching components; (2) fiber-type branching components; and (3) guided-wave type branching components.

The bulk-type branching components are constructed by arranging microlenses, prisms, interference-film filters, etc., and have little wavelength dependence. Although the bulk-type branching components can be put into practical use to some extent, the components require a long time for assembly and adjustment, and present some problems with regard to long-term reliability, cost and size.

The fiber-type branching components are fabricated, using optical fibers as constituent material, through processes which may include grinding and polishing, fusing and elongating. Although this type of component makes it possible to produce branching components of reduced wavelength dependence, the fabrication process requires skill, and is not suitable for mass production because of lack of reproducibility.

In contrast, guided-wave type branching components have the advantage that they can be constructed on flat substrates in large quantities through the photolithography process. Hence, they attract attention as a promising type of branching component which can be reproduced and integrated as compact parts.

FIG. 1 is a planar view exemplifying a configuration of a conventional (2×2) guided-wave type branching component. In FIG. 1, two optical waveguides 2 and 3 are formed on a flat substrate 1. A part of the optical waveguide 2 and a part of the optical waveguide 3 are brought into proximity with each other to form a directional coupler 4. The directional coupler 4 is designed in such a way that an optical signal launched into a port 5 is branched to ports 6 and 8 to be outputted. Although the power coupling ratio of the directional coupler 4 can be specified to a desired value at a particular desired wavelength, the wavelength dependence of the coupling ratio presents a problem when the branching component is used in a wide wavelength region.

FIG. 2 shows an example of the wavelength dependence of the coupling ratio of the directional coupler type guided-wave branching component in FIG. 1. In FIG. 2, when the coupling ratio is set to 50% at 1.3 μm wavelength, the coupling ratio at 1.55 μm approximates to 100%. This shows that it is impossible for the branching component to operate simultaneously at wavelengths of 1.3 μm and 1.55 μm.

Generally speaking, the power coupling ratio C of a directional coupler is given by the following equation:

$$C = \sin^2 \Psi \tag{1}$$

where $\Psi$ depends on a space between the waveguides at the coupling region of the directional coupler, the length of the coupling region, wavelength, etc. In the example in FIG. 2, $\Psi$ is approximately zero at 1.0 μm wavelength, $\pi/4$ at 1.3 μm, and $\pi/2$ at 1.6 μm. As a result, C varies approximately sinusoidally in accordance with the wavelength. This is the reason why the coupling ratio of 50% cannot be maintained in a wide wavelength region in FIG. 2.

Another configuration of a guided-wave branching component is known as a "Y-branching" type. Although the wavelength dependence of the coupling ratio (i.e., branching ratio) of the Y-branching type is small, it has a basic disadvantage in that an optical power loss of more than about 1 dB cannot be avoided at the Y-branching region. In addition, the Y-branching type cannot perform all of the functions or uses of the directional coupler type because the Y-branching type has only three ports whereas the directional coupler type has four ports.

The above describes the problems with regard to a conventional (2×2) type guided-wave branching component. Next, problems concerning a conventional (3×3) type guided-wave branching component will be described.

FIG. 3 is a planar view exemplifying the configuration of a conventional (3×3) type guided-wave branching component. In FIG. 3, three optical waveguides 10, 11, and 12 are formed on a flat substrate 9. A part of each waveguide is brought into proximity with the others so as to form a directional coupler 13. The directional coupler 13 is designed in such a way that an optical signal launched into a port 15 is equally branched to ports 17, 18 and 19 to be outputted. Although the power coupling ratio of the directional coupler 13 can be specified to a desired value at a particular desired wavelength, the wavelength dependence of the coupling ratio presents a problem when the branching component is used in a wide wavelength region.

FIG. 4 shows an example of the wavelength dependence of the coupling ratio of the guided-wave branching component shown in FIG. 3. In FIG. 4, when the coupling ratios are set in such a manner that the optical signal is equally divided to each output port 17, 18 and 19 at wavelength of 1.3 μm (i.e., coupling ratios $I_{15\text{-}17} = I_{15\text{-}19} = 0.33$, $I_{15\text{-}18} = 0.34$), the coupling ratios at 1.55 μm become $I_{15\text{-}17} = I_{15\text{-}19} = 0.45$, $I_{15\text{-}18} = 0.10$. Therefore, the branching component cannot be used as an equal branching component which operates simultaneously at the wavelengths of 1.3 μm and 1.55 μm.

Generally speaking, the power coupling ratio C ($=I_{15\text{-}17}\text{-}I_{15\text{-}19}$) of a (3×3) directional coupler when the optical signal is launched into the center optical waveguide (waveguide 11 in FIG. 3) is given by the following equation:

$$C = (\sin^2 \Psi)/2 \tag{1'}$$

where $\Psi$ depends on the space between the optical waveguides at the coupling region of the directional coupler, the length of the coupling region, the wavelength, etc. Usually, $\Psi$ increases with an increase in wavelength. This is the reason why the coupling ratio of 33% (C=33%) cannot be maintained in a wide wavelength region in FIG. 4.

Although the problems with regard to a conventional (3×3) optical branching component is described above using the example of a guided-wave type, the fiber type branching components have similar problems.

Next, a conventional optical switch will be described. Optical switches are going to play an important role in the near future, because they are necessary to freely switch optical fiber communication lines to meet demand, or to establish an alternate route during a communication line failure.

The configurations of optical switches are divided into two classes: (1) bulk type; and (2) guided-wave type. These types have respective problems. The bulk type is arranged by using movable prism, lenses, or the like as constituents. The advantage of the bulk type is that the wavelength dependence is small, and the optical power loss is low. However, the bulk type is not suitable for mass production because the assembly and adjusting processes are tedious, and in addition, it is expensive. These disadvantages hinder the bulk-type from being widely used.

In contrast, the guided-wave type optical switches can be mass-produced because integrated optical switches of this type can be constructed with waveguides on substrates by using the lithography or microfabrication technique. The guided-wave type is a highly promising type of optical switch.

FIG. 5 is a planar view exemplifying the configuration of a conventional guided-wave type optical switch. In FIG. 5, each of the two 3-dB optical couplers 21 and 22 are formed on substrate 20 as directional couplers, each of which is formed by two optical waveguides 23 and 24 placed side by side in close proximity. The coupling ratio of each 3-dB optical coupler 21 and 23 is specified as 50% (i.e., a half of the complete coupling length) at the wavelength of the optical signal. The optical-path lengths of the two waveguides 23 and 24 which connect the two 3-dB couplers 21 and 22 are set to have the same value when phase shifters 25 and 26 formed midway between the 3-dB couplers are not in operation.

In this condition, an optical signal launched into a port 27 is emitted from an output port 30 and not from an output port 29. In contrast, the optical signal is switched to the output port 29 when at least one of the phase shifters 25 and 26 is operated so as to produce the optical-path length difference of about ½ wavelength (that is, an optical phase of 180 degrees or $\pi$ radian) between the optical waveguides 23 and 24. Thus, the device works as an optical switch. This guided-wave type optical switch is also called a Mach-Zehnder interferometer type optical switch, and can accomplish a switching function by using rather simple phase shifters. For this reason, various waveguides made of different materials including glass have been employed to construct the Mach-Zehnder interferometer-type optical switches. These conventional guided-wave optical switches present the following problems:

FIG. 6 shows a set of characteristic curves representing the wavelength dependence of the coupling ratios between the input port 27 and output port 30 of the optical switch which is designed and constructed to be used at the wavelength of 1.3 μm. Curve (a) shows the coupling characteristics when the phase shifters 25 and 26 are in the OFF state, curve (b) shows the coupling characteristics when one of the two phase shifters 25 and 26 is in the ON state, and curve (c) shows, as a reference, the wavelength dependence of the coupling ratio of respective 3-dB optical couplers which constitute the optical switch.

When one of the phase shifters 25 or 26 is in the ON state (curve (b)), coupling ratio $I_{27\text{-}30}$ is approximately zero (below 5%) in a considerable wide wavelength region of about 1.3 μm±0.2 μm. Hence, the optical signal is transmitted through the path (27→29) with little wavelength dependence in this region.

In contrast, when the phase shifters 25 and 26 are in the OFF state (curve (a)), the coupling ratio $I_{27\text{-}30}$ above 90% is restricted to a narrow region of 1.3 μm±0.1 μm. Outside of this region, for example, at the wavelength of 1.55 μm, the coupling ratio reaches only about 50%. This means that the switching cannot be accomplished appropriately, and this presents a great problem.

The large wavelength dependence of the conventional guided-wave optical switch shown in FIG. 5 mainly results from the following: the 3-dB optical couplers (the directional couplers) exhibit a large wavelength dependence as shown by the curve (c) in FIG. 6; when the coupling ratio is specified to 50% at the wavelength of 1.3 μm as shown by the curve (c), it increases to far above 50% with an increase of wavelength, and hence, the 3-dB couplers cannot accomplish their role.

Optical signals having wavelengths of 1.3 μm and 1.55 μm are often transmitted simultaneously in the optical switches used for switching optical fiber communication lines. Hence, the optical switches having a large wavelength dependence present a great problem in a practical use.

So far, the problem results from the large wavelength dependence of the coupling ratio is has been described with regard to conventional optical branching components and optical switches using the example of optical signals whose wavelengths are 1.3 μm and 1.55 μm which are widely used. In reality, however, the wavelength dependence at the wavelength of 1.65 μm is also a great problem, because the wavelength of 1.65 μm is used as a monitor beam in OTDR (Optical Time Domain Reflectometer) to determine the state of a transmission line on the basis of the back-scattered waveform of the monitor beam sent. Thus, not only are optical signals having wavelengths of 1.3 μm and 1.55 μm simultaneously transmitted through the optical switches, but also the monitor signal having a wavelength of 1.65 μm may be transmitted through the optical switches.

SUMMARY OF THE INVENTION

Therefore, a first object of the invention is to provide guided-wave optical branching components having a lower power loss and a lower wavelength dependence of the coupling ratio, for example, of about 50%±10% in the wavelength region of 1.3 μm-1.65 μm.

A second object of the present invention is to provide guided-wave optical switches which operate with lower wavelength dependence in a desired wavelength region, for example, of 1.3 μm-1.65 μm.

To accomplish the first object, the present invention is provided with a Mach-Zehnder interferometer, the Mach-Zehnder interferometer being composed of two directional couplers which are connected by two optical waveguides; the optical-path lengths of the two optical waveguides differing from each other by a slight difference of ΔL; and the directional couplers and the optical waveguides constituting an optical branching component.

More specifically, the guided-wave optical branching component of the present invention is characterized in that the guided-wave optical branching component has two or more optical waveguides, the optical waveguides being in close proximity with one another at a plurality of positions so as to constitute a plurality of directional couplers, one end of each the optical waveguides being an input port and the other end of each the optical waveguide being an output port, and in that the effective optical-path length of at least one of the optical waveguides differs from that of the other optical waveguides between two arbitrarily selected adjacent directional couplers, the difference of the effective optical-path length being less than the shortest wavelength in the operational wavelength region of the guided-wave optical branching component, the coupling ratio of each of the two adjacent directional couplers monotonically increasing with wavelength in the operational wavelength region.

In addition, the two or more optical waveguides are placed on a substrate, or composed of optical fibers.

Moreover, the guided-wave optical branching component is provided with two input ports and two output ports, or with three input ports and three output ports.

Furthermore, the coupling ratios of the two adjacent directional couplers are set different from each other.

And finally, the guided-wave optical branching component can be provided with an optical phase shifter for fine adjusting the effective optical-path length between the adjacent directional couplers.

The optical branching component of the present invention greatly differs from a conventional directional-coupler-type optical branching component in that it connects two directional couplers in such a way as to provide a phase difference of Θ that corresponds to the difference ΔL of the optical-path lengths, thus decreasing the wavelength dependence of the directional couplers.

The difference between the present invention and a conventional Mach-Zehnder interferometer will now be described in more detail because the optical branching component of the present invention looks like a Mach-Zehnder interferometer itself in appearance.

In a conventional Mach-Zehnder interferometer, a directional coupler that constitutes the interferometer is designed so that the coupling ratio of the coupler takes a value of 50%. It is known also that a Mach-Zehnder interferometer including a pair of directional couplers functions as an optical switch in the following conditions: two optical waveguides connecting the two directional couplers are designed to have an equal optical-path length (i.e., the difference ΔL thereof is zero); an effective optical path length of one of the two optical waveguides is reciprocally modified by ½ wavelength by means of the electro-optical or thermo-optical effect.

Furthermore, it is known that the Mach-Zehnder interferometer, which includes two directional couplers whose coupling ratio is 50% at a particular wavelength, and two optical waveguides that connect the two directional couplers, each having greatly different length, functions as an optical multiplexer/demultiplexer for optical frequency multiplexing (a multiplexer/demultiplexer for high-density wavelength multiplexing). For example, a Mach-Zehnder interferometer, which uses optical waveguides made of silica glass or the like and is designed in such a way that the optical-path length difference ΔL is approximately 10 mm, can multiplex or demultiplex the two-channel optical signals separated by 10 GHz from other (which corresponds to a separation of 0.1 nanometer in wavelength).

So far, design examples of conventional Mach-Zehnder interferometers have been described. As described above, the conventional Mach-Zehnder interferometers are designed to achieve optical switching functions or multiplexing/demultiplexing functions. The conception of the present invention to create an optical branching component that can reduce the wavelength dependence in a wide wavelength region is not suggested at all in the conventional technique. To reduce the wavelength dependence of the optical branching component over a wide range of wavelengths, each of the two directional couplers constituting the Mach-Zehnder interferometer of the present invention must satisfy particular conditions that the present invention imposes: the conditions with regard to the effective optical-path length difference and the wavelength dependence of each directional coupler. The conventional Mach-Zehnder interferometers cannot be applied without changes. The present invention is based on an entirely new conception and experiments which show that Mach-Zehnder interferometer arrangements, the application of which have been conventionally restricted to the field of optical switches or optical multiplexers/demultiplexers, can be applied to optical branching components, and that the optical components can operate in a desired wide wavelength region, achieving the above objectives.

FIG. 7 is a planar view showing a basic configuration of a guided-wave optical branching component of the present invention. In FIG. 7, optical waveguides 32 and 33 are placed on a flat substrate 31. Two directional couplers 34 and 35 are constructed by placing the optical waveguides 32 and 33 side by side in close proximity at two positions. One end of the optical waveguide 32 is an input port 36 into which an optical signal Pin is launched, and the other end of the optical waveguide 32 is a main-output port 38 from which a main optical signal Pmain is emitted. Similarly, one end of the optical waveguide 33 is an input port 37, and the other end of the optical waveguide 33 is a sub-output port 39 from which a sub-optical signal Psub is emitted.

The optical-path lengths of the optical waveguides 32 and 33 between the two directional couplers 34 and 35 are different from each other by a small quantity ΔL. The optical-path length difference ΔL of this Mach-Zehnder interferometer produces a phase difference Θ between the two directional couplers 34 and 35, and the phase difference Θ is given by:

$$\Theta = 2\pi \cdot n \cdot \Delta L / \lambda \tag{2}$$

where n = refractive index of the optical waveguides; and λ = wavelength. The power coupling ratio Cmz of the entire Mach-Zehnder-interferometer-type branching component is given by the following equation:

$$Cmz = \sin^2(2\Psi)\cdot(1+\cos\Theta)/2 \qquad (3)$$

where $\Psi$ is the variable in the equation (1) that defines the coupling ratio C ($=\sin^2\Psi$) of each directional coupler.

The present invention, as seen from the equation (3), is based on the principle that the wavelength dependence of the $\sin^2(2\Psi)$ term is canceled by the wavelength dependence of the $(1+\cos\Theta)/2$ term, i.e., by the wavelength dependence of the phase difference $\Theta$ in the equation (2). To achieve a desired coupling ratio of little wavelength dependence in a specified wavelength region by canceling the wavelength dependence of the $\sin^2(2\Psi)$ term by that of the $(1+\cos\Theta)/2$ term, it is necessary to determine the wavelength dependence of the coupling ratio C of each of the directional couplers 34 and 35, and to appropriately determine the difference ΔL by considering the equation (3).

The design principle used to produce the optical wavelength dependence of the coupling ratio in the wavelength region of λ1 to λ2 is as follows: first, each directional coupler is designed in such a way that the coupling ratio monotonically increases with wavelength; second, the value (n·ΔL) between the two directional couplers, i.e., the difference of the effective optical-path lengths between the two couplers is preferably specified to the value λ0 which is slightly shorter than the shortest wavelength λ1. Under such a condition, at the wavelength of λ=λ0, Θ in the equation (2) takes a value 2π and so the value of the (1+cosΘ)/2 term becomes the maximum value 1. Thus, the coupling ratio of the overall optical branching component is equal to that of the two directional couplers connected together. When the wavelength λ exceeds the λ1, the (1+cosΘ)/2 term declines which functions to inhibit the increasing inclination of the $\sin^2(2\Psi)$ term. How far the inhibiting influence can be extended towards the longer wavelength region, so as to extend the longest wavelength λ2 in the wavelength region, depends upon the design details of each directional coupler.

So far, the basic configuration of the (2×2) optical branching component of the present invention has been described. It is clear that this description holds in the case of a (3×3) optical branching component.

Next, the second object of the present invention will be described. This object is to provide guided wave optical switches which have lower wavelength dependence in a desired wavelength region.

To attain the second object, an optical switch of the present invention is arranged as follows: first, two 3-dB optical couplers that constitute the optical switch are arranged in the form of the Mach-Zehnder interferometer; second, the optical-path length difference of the Mach-Zehnder interferometer is set slightly shorter than the shortest wavelength (approximately 1 μm) in the wavelength region. More specifically, each 3-dB optical coupler has two directional couplers connected by two optical waveguides which are provided with the optical-path length difference of approximately 1 μm; and two 3-dB optical couplers thus constructed are connected through two waveguides provided with phase shifters. Thus, the whole optical switch is constructed.

More specifically, the guided-wave optical switch of the present invention is characterized in that the guided-wave optical switch has two optical waveguides, a primary and a secondary 3-dB optical coupling members, and an optical phase shifter, each of the primary and secondary 3-dB optical coupling members coupling the two optical waveguides at different positions, the optical phase shifter being placed on the optical waveguides between the primary and secondary 3-dB optical coupling members so as to fine adjust the optical-path length of the optical waveguides; in that each of the primary and secondary 3-dB optical coupling members has two directional couplers formed by bringing the two optical waveguides into close proximity at different positions; in that the effective optical-path length of one of the optical waveguides differs from that of the other optical waveguide between the two directional couplers, the difference of the effective optical-path length being less than the shortest wavelength in the predetermined operational wavelength region, and the coupling ratio of each of the two directional couplers monotonically increasing with wavelength in the operational wavelength region; and in that the optical waveguide having a longer optical-path length in the primary 3-dB optical coupling member, and the optical waveguide having a longer optical-path length in the secondary 3-dB optical coupling member are different optical waveguides.

In addition, the two optical waveguides are placed on a substrate, or composed of optical fibers.

Furthermore, the coupling ratios of the two directional couplers are set different from each other.

It is preferable that the operation wavelength region include a region of 1.3 μm to 1.65 μm, the optical-path length difference in the 3-dB optical coupler be approximately 1 μm, and the wavelength dependence of the coupling ratio of the 3-dB optical coupler be reduced in the wavelength region of 1.3 μm to 1.65 μm.

The optical waveguides are made of glass optical waveguides, and the optical phase shifters are composed of thermo-optical effect phase shifters made of thin film heater deposited on the glass optical waveguides.

The optical switch of the present invention can accomplish switching in a wide wavelength region by improving the large wavelength dependence of the 3-dB optical couplers in the conventional Mach-Zehnder optical switch. More specifically, the optical switch of the present invention utilizes the wide wavelength optical branching components described above as the 3-dB optical couplers which achieves a 50% branching in a wide wavelength range, thus performing switching in a wide wavelength region. The construction and operation of the optical switch will be described below.

Assuming that the lengths of coupling regions of the directional couplers constituting the 3-dB optical coupler (Mach-Zehnder interferometer circuit) are L1 and L2, and the optical-path length difference of the waveguides connecting the directional couplers is λ0. If λ0 = 0.0 μm, the characteristics of the coupling ratio of the 3-dB optical coupler is the same as those of a directional coupler whose coupling region length is (L1+L2), and the coupling ratio monotonically increases from 0% to 100% as the wavelength λ increases, as depicted by the curve (c) in FIG. 6. This presents no improvement.

In contrast, the present invention has an optical-path length difference λ0 of approximately 1 μm between the two optical couplers in each 3-dB directional coupler which operate in a manner similar to the optical branching component described above. The operation of the optical switch of the present invention is as follows:

When the wavelength λ is approximately λ0, the optical-path length difference is equal to the wavelength of the optical signal. Hence, the overall coupling ratio of the (Mach-Zehnder interferometer type) 3-dB optical coupler is equal to that of the directional coupler whose coupling region length is equal to (L1+L2). This is based upon the principle of optical interference. The optical-path length difference of the Mach-Zehnder interferometer, which is equal to the wavelength multiplied by an integer, cannot be distinguished from an optical-path length difference of zero.

As the wavelength of the optical signal exceeds λ0 and reaches 1.3 μm or 1.55 μm, the optical-path length difference gradually separates from the wavelength multiplied by an integer (here, ×1), and takes a value of wavelength multiplied by a fraction. In such a condition, a significant phase difference, i.e., a phase difference other than the 2π multiplied by an integer, appears between the two directional couplers constituting the 3-dB optical couplers in the form of a Mach-Zehnder interferometer. Because of this phase shift, the equivalent coupling length of the overall 3-dB optical coupler diverges from the simple sum total of L1 and L2, and declines gradually. In this case, the coupling ratio of the 3-dB optical coupler can be maintained at approximately 50% in a desired wavelength region, for example, in the region of 1.3-1.65 μm, as long as the optical-path length difference λ0 and the coupling lengths L1 and L2 of the respective directional couplers are appropriately specified so that the increase of the coupling ratio of the simple directional coupler (whose coupling length is (L1+L2)), which results from the increase in the wavelength, can be inhibited by the reduction of the equivalent coupling length resulting from the phase shift. Thus, the optical switch constructed by combining Mach-Zehnder interferometer type 3-dB optical couplers makes it possible for several optical signals of different wavelengths in a desired wavelength region to be operated simultaneously.

DESCRIPTION OF THE PREFERRED EMBODIMENTS

Figure 1:
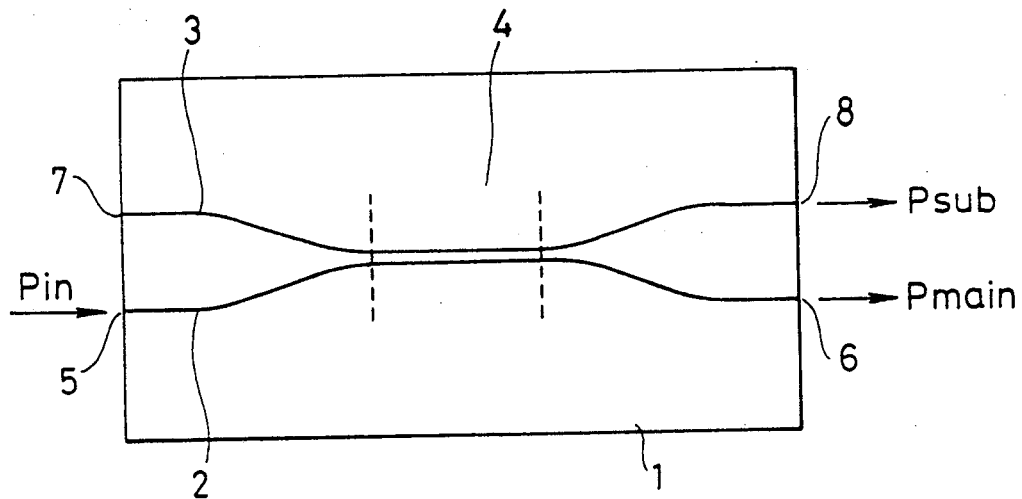
FIG. 1 is a planar view showing a configuration of a conventional guided-wave optical branching component.
Figure 2:
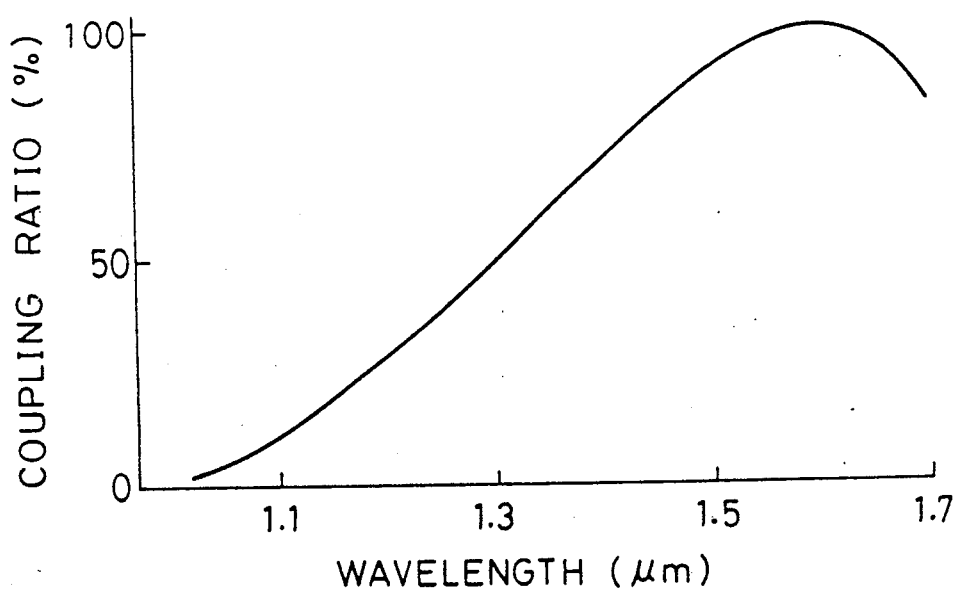
FIG. 2 is a graph showing the wavelength dependence of the coupling ratio of the conventional guided-wave optical branching component.
Figure 3:
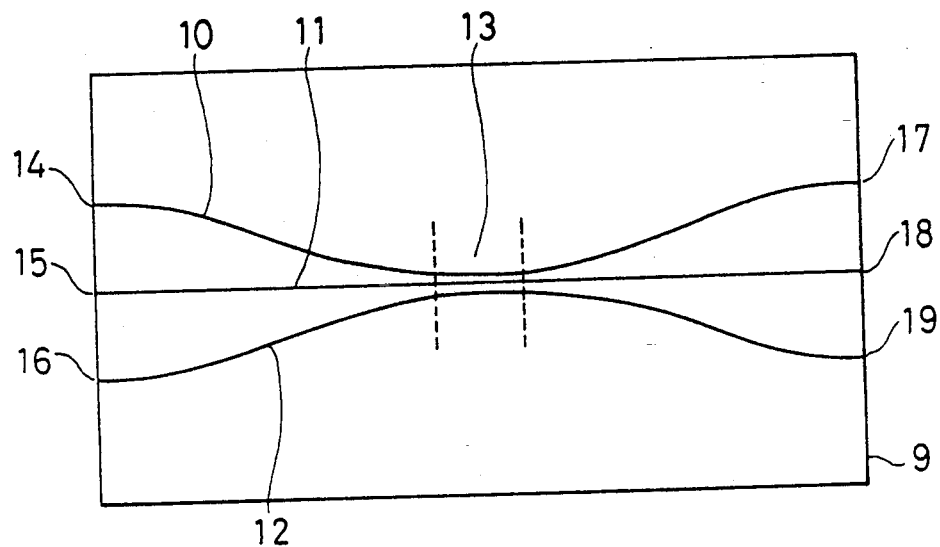
FIG. 3 is a planar view showing a configuration of a conventional guided-wave (3×3) optical branching component.

Embodiments of the invention will now be described with reference to the accompanying drawings. Embodiments 1-10 below are examples of guided-wave ($2\times2$) optical branching components, embodiments 11-13 are examples of guided-wave ($3\times3$) optical branching components, and embodiments 14 and 15 are examples of guided-wave optical switches.

Hereinafter, embodiments of the present invention are described, which use silica-based single-mode waveguides formed on a silicon substrate as optical waveguides. The silica-based single-mode waveguides are well connected to single-mode optical fibers, providing practical guided-wave optical branching components. The waveguides of the present invention, however, are not restricted to the silica-based optical waveguides.

EMBODIMENT 1

FIGS. 8A-8D are a planar view, enlarged cross-sectional views along section lines A-A', B-B', and C-C', respectively, of a guided-wave optical branching component according to the first embodiment of the present invention. The branching component is designed so that the coupling ratio thereof is 50% ±10% in a wavelength region of 1.25 $\mu$m ($=\lambda1$) to 1.6 $\mu$m ($=\lambda2$).

A substrate 40 is a silicon substrate, and optical waveguides 41 and 42 are silica-based optical waveguides formed on the silicon substrate 40 using a silica-based glass material. The optical waveguides 41 and 42 are brought into close proximity to each other at two positions on the substrate, thus forming directional couplers 43 and 44.

The optical waveguides 41 and 42 are composed of $SiO_2$-$TiO_2$-based glass cores each of which has a cross section of about 8 $\mu$m$\times$8 $\mu$m, and is embedded in a cladding layer 45 of about 50 $\mu$m thick made of $SiO_2$-based glass. The Mach-Zehnder interferometer circuit is constructed by combining linear patterns and arc patterns whose radius of curvature is 50 mm. The silica-based optical waveguides 41 and 42 can be formed by means of the known combination of glass-film deposition and microfabrication techniques: the glass-film deposition technique uses flame-hydrolysis reaction of a silicon tetrachloride and a titanium tetrachloride; the micro-fabrication technique uses reactive-ion etching.

At each coupling region of directional couplers 43 and 44, the two optical waveguides are separated by 4 $\mu$m, and are placed in parallel over a 0.3 mm long.

The input ports 46 and 47 are separated by 0.250 mm, and the output ports 48 and 49 are also separated by 0.250 mm. The waveguide lengths of the respective optical waveguides 41 and 42 between the two directional couplers 43 and 44 are L and L+$\Delta$L, and the effective optical-path length difference (n·$\Delta$L) is set to 1.15 $\mu$m. Here, $\Delta$L assumes a value of 0.79 $\mu$m, because the refractive index n of the silica-based optical waveguide is approximately 1.45. $\Delta$L can be accurately set at the photolithographic mask pattern step by using a slight difference in the lengths of curved waveguide and straight waveguide between the two directional couplers 43 and 44 in FIG. 8A.

Figure 9:
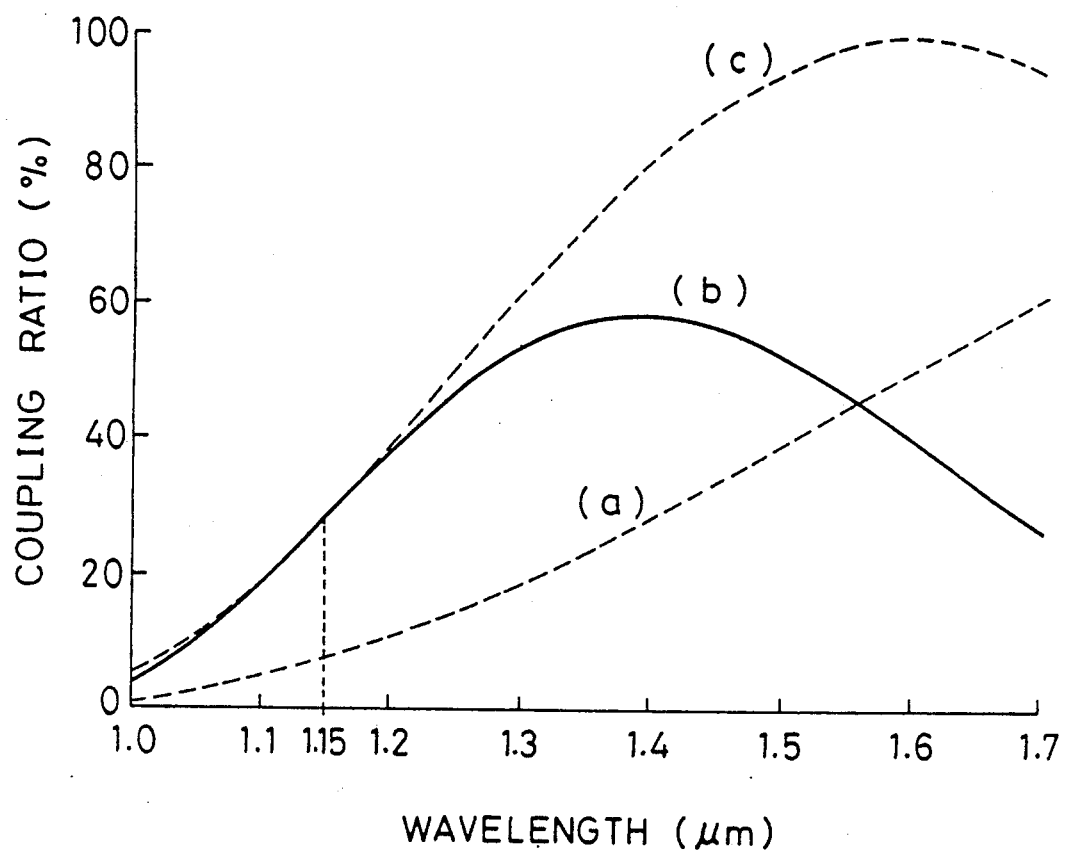
FIG. 9 is a graph showing the wavelength dependence of the coupling ratio of the guided-wave optical branching component of the first embodiment.

FIG. 9 is a graph illustrating the wavelength dependence of the coupling ratio of the optical branching component of the embodiment: curve (a) shows the coupling ratio characteristics of each directional coupler 43 or 44 which constitutes the branching component; curve (b) shows the coupling ratio characteristics of the Mach-Zehnder interferometer type optical branching component according to the present invention in which n·$\Delta$L=1.15 $\mu$m; curve (c) shows the coupling ratio characteristics when n·$\Delta$L=0.0 $\Delta$m, i.e., when $Cmz = \sin^2(2\Psi)$ is satisfied in the equation (3).

In curves (a) and (c), the coupling ratio monotonically increases with wavelength. In curve (b), on the other hand, the coupling ratio moderately varies with a peak at approximately 1.4 $\mu$m, and is maintained at 50% ±10% in a wavelength region of $\lambda1=1.25$ $\mu$m to $\lambda2=1.6$ $\mu$m. This is because the monotonic increase of the coupling ratio of the optical branching component of the embodiment (see curve (c)) is limited by the effect of appropriately set value (n·$\Delta$L). In other words, the value $Cmz$ in equation (3) is restricted by the $(1+\cos\Theta)/2$ term, the value $\Theta$ of which is determined by (n·$\Delta$L) in equation (2). If $\lambda0 = $n·$\Delta$L, $\Theta = 2\pi\lambda0/\lambda$ is obtained from equation (2). Consequently, when the wavelength $\lambda$ is equal to $\lambda 0$ ($=n\cdot\Delta L$), $\Theta=2\pi$ is satisfied, and hence $Cmz=\sin^2(2\Psi)$ is obtained from equation (3).

As a result, curves (b) and (c) overlap at this point (at $\lambda=\lambda 0=1.15$ $\mu$m) in FIG. 9. When $\lambda$, increases over $\lambda 0$, the $(1+\cos\Theta)/2$ term begins to decrease from 1, and functions so as to limit the increase of the $\sin^2(2\Psi)$ term. This suggests that it is preferable that $\lambda 0$ ($=1.15$ $\mu$m) be set slightly shorter than the shortest wavelength $\lambda 1$ ($=1.25$ $\mu$m).

Thus, according to the embodiment, the optical-path length difference corresponding to the phase difference $\Theta=2\pi\lambda 0/\lambda$ is provided to the two directional couplers, the coupling ratios of which monotonically increase to 100%, and thus provides the overall system including the two directional couplers with asymmetry produced by (n·$\Delta L$). This in turn inhibits the coupling ratio of the optical branching component from reaching 100%, and thus, the maximum coupling ratio occurs in about the middle of the desired wavelength region of $\lambda 1$ to $\lambda 2$.

Incidentally, the coupling ratio of the directional coupler itself (curve (a)) must monotonically increase so as to monotonically increase the coupling ratio of the optical branching component (curve (c)).

Figure 10:
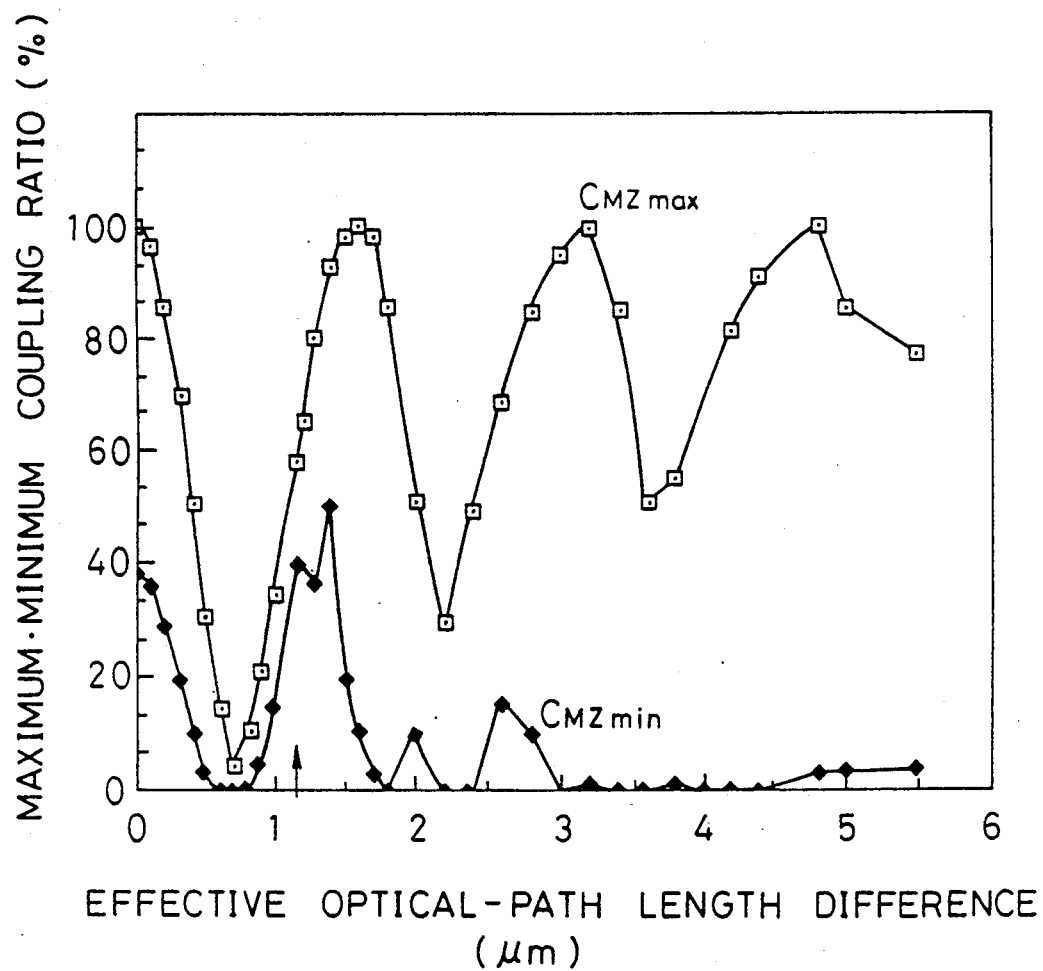
FIG. 10 is a graph illustrating the importance of the appropriate setting of the effective optical-path length difference (n·ΔL) in the first embodiment.

FIG. 10 is a graph illustrating the importance of the appropriate setting of the effective optical-path length difference (n·$\Delta L$) in the embodiment. In FIG. 10, the maximum values Cmzmax and the minimum values Cmzmin of the coupling ratio Cmz obtained by theoretical calculations are plotted as the functions of the effective optical-path length differences in the wavelength region of 1.2 $\mu$m to 1.6 $\mu$m. From FIG. 10, it is well understood that the wavelength dependence of the coupling ratio can be reduced in the above mentioned wavelength region only when the effective optical-wavelength difference is around 1.15 $\mu$m at which Cmzmax and Cmzmin approaches a desired coupling ratio of 50%. When the effective optical-path length difference exceeds about 1.5 $\mu$m, Cmzmin approaches zero in general, and the difference from the Cmzmax increases. Thus, the optical interferometer exhibits wavelength characteristics similar to an optical filter that separates light of different wavelengths. This is not appropriate for the purpose of the present invention. On the other hand, when the effective optical-path length difference is close to zero, the wavelength dependence of the directional coupler itself which constitutes the optical interferometer is large, which is also inappropriate. Thus, a high degree of accuracy better than a sub-micron order is required in setting (n·$\Delta L$) and $\Delta L$. This, however, can be easily accomplished by the current photolithography.

The optical branching component of the embodiment is compact, the sizes being 25 mm long and 2.5 mm wide, and 40 components can be constructed simultaneously on a 3-inch Si wafer substrate.

The optical power loss of the optical branching component of the embodiment is very low, approximately 0.2 dB. The total power loss of the optical branching component including the connection loss between the component and the single mode optical fibers connected to the input and output ports is approximately 0.5 dB, which is sufficiently low for practical use. This is an outstanding feature of the branching component in contrast with a conventional Y-type branching component, the power loss of which including the fiber-connection losses is no less than 1.5 dB. This is because the optical branching component of the present invention does not include a unique point such as a Y-branching point, and hence the component is constructed using only smooth patterns similar to those of a directional coupler.

EMBODIMENT 2

Figure 11:
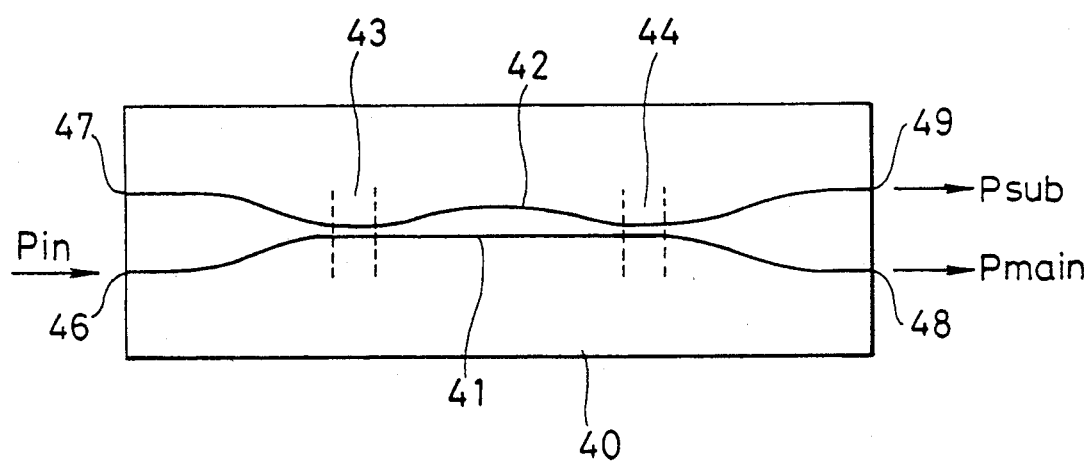
FIG. 11 is a planar view showing a configuration of the guided-wave optical branching component according to the second embodiment of the present invention.

FIG. 11 is a planar view of the optical branching component of the second embodiment of the present invention, the coupling ratio of which is 20% ±5% in a wavelength region from $\lambda 1=1.25$ $\mu$m to $\lambda 2=1.75$ $\mu$m. The configuration of the optical branching component is substantially similar to that of the first embodiment in FIG. 8A. The former is different from the latter in that input ports 46 and 47, and output ports 48 and 49 are located symmetrically about the horizontal middle line of the component (although it is possible to position these ports in a manner similar to those in FIG. 8A). The coupling regions of directional couplers 43 and 44 have weaker coupling than those of the first embodiment: the separation between the two waveguides is 4 $\mu$m, and the length of the coupling region (interaction length) is 0.1 mm. The value of (n·$\Delta L$) is set to 1.15 $\mu$m as in the first embodiment. The length of the component of the second embodiment is 20 mm.

Figure 12:
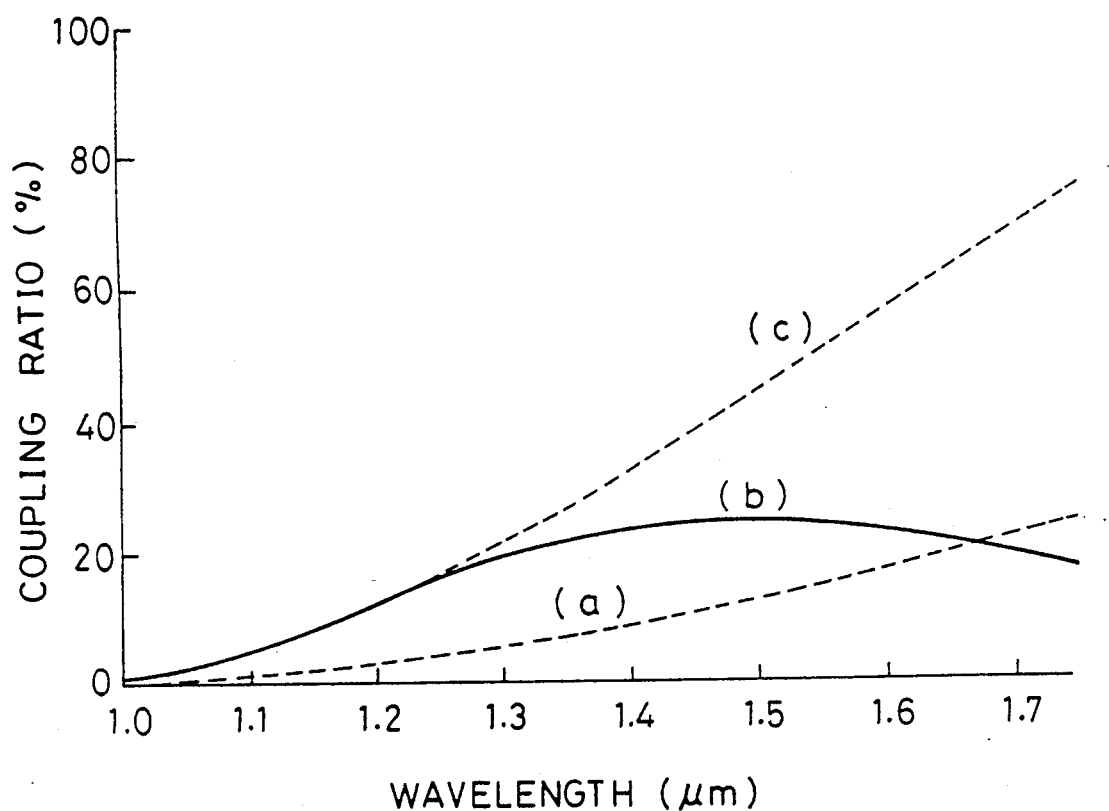
FIG. 12 is a graph showing the wavelength dependence of the coupling ratio of the guided-wave optical branching component of the second embodiment.

In FIG. 12, curve (b) shows the wavelength dependence of the coupling ratio of the optical branching component of the second embodiment. For the convenience of comparison, wavelength characteristics of the single directional coupler are shown by curve (a), and the wavelength characteristics of the two directional couplers connected together (i.e., n·$\Delta L=0.0$ $\mu$m) are depicted by curve (c). In the curves (a) and (c), the coupling ratios increase with wavelength. In contrast, in the curve (b), the wavelength region in which the coupling ratio is maintained within 20% ±5% extends from 1.25 $\mu$m to 1.75 $\mu$m with a peak at approximately 1.50 $\mu$m.

EMBODIMENT 3

Figure 13:
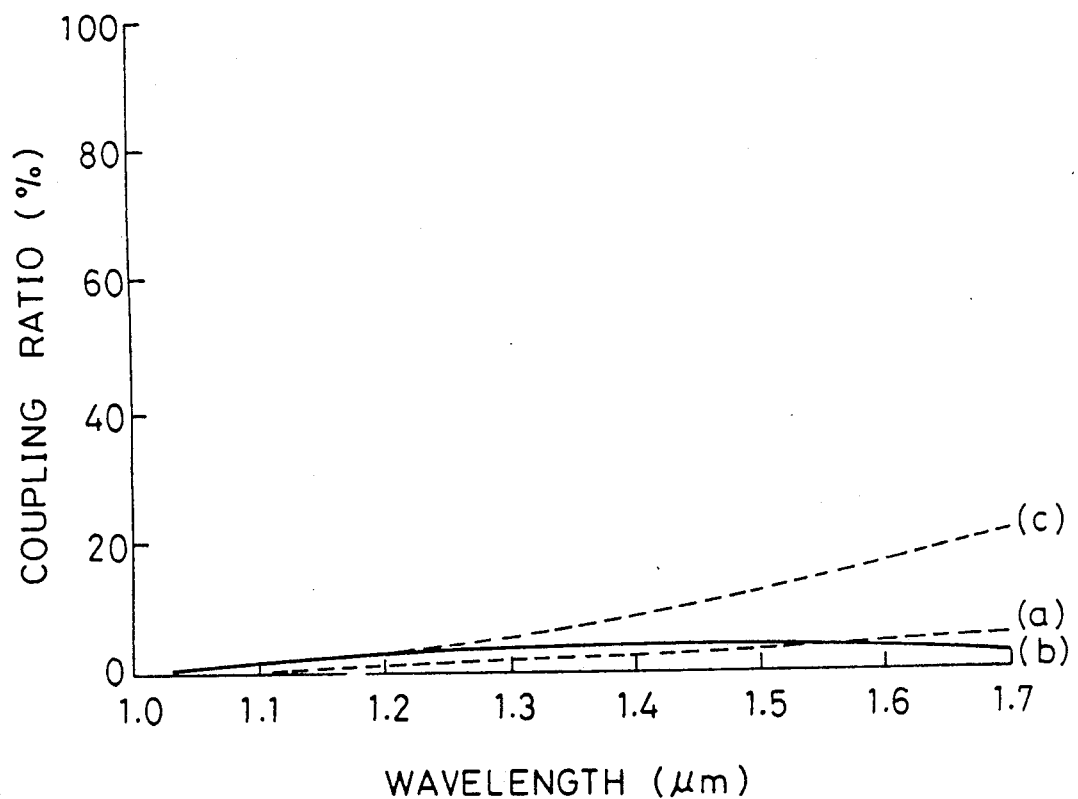
FIG. 13 is a graph showing the wavelength dependence of the coupling ratio of the guided-wave optical branching component according to the third embodiment of the present invention.

Curve (b) in FIG. 13 shows the wavelength dependence of the coupling ratio of the optical branching component according to the third embodiment of the present invention: the coupling ratio thereof is designed and fabricated to be maintained within 4% ±1% in the wavelength region of $\lambda 1=1.25$ $\mu$m to $\lambda 2=1.65$ $\mu$m. For the convenience of comparison, the wavelength dependence of the single directional coupler is shown by curve (a), and the wavelength dependence of the two directional couplers directly connected together (n·$\Delta L=0.0$ $\mu$m) is shown by curve (c). Although the configuration of the embodiment is substantially similar to that of the second embodiment, the separation between the two waveguides in the coupling region of each directional coupler is widened to 5 $\mu$m so as to achieve weaker coupling than that of the second embodiment. The value of (n·$\Delta L$) is set to 1.05 $\mu$m.

The structural parameters of the coupling region of the directional couplers in the preceding embodiments has been described. These parameters can be appropriately modified in consideration of various peculiarities of the fabrication processes because a directional coupler is very sensitive to changes in the structural arrangement. The essential consideration is that each directional coupler constituting the Mach-Zehnder interferometer should be designed and fabricated to exhibit wavelength characteristics similar to those depicted by the curves (a) in FIGS. 9, 12 and 13.

It should be noted that although in the embodiments described above the optical waveguides 42 are made longer than the optical waveguides 41 by ΔL between the two directional couplers, the opposite setting is also possible, i.e., the optical waveguides 41 can be made longer than the optical waveguides 42 by ΔL. This achieves the same branching characteristics.

In the preceding embodiments, the coupling ratio of each directional coupler constituting the branching component, which monotonically increases in a desired wavelength region including the region of 1.3 μm to 1.55 μm, is decreased by means of n·ΔL (=λ0 Which is set around 1.1 μm. This is because the directional coupler that satisfies the above conditions is easy to design and fabricate. The present invention, however, is not limited to the examples described above. The essential thing is that the wavelength dependencies of the first and second terms of the equation (3) must be canceled in a desired wavelength region. Hence, it should be noted that other arrangements are possible.

Although the above wavelength region including the region of 1.3 μm to 1.55 μm is most important in the optical fiber communication field, optical branching components used in the optical sensor application field can be designed and fabricated so as to work in the wavelength region which includes the visible range.

In the preceding embodiments, the two directional couplers 43 and 44 have the same coupling ratio characteristics. The present invention, however, is not limited to this, i.e., the coupling ratios of the two directional couplers need not necessarily be the same; they may be different. In this case, the power coupling ratio Cmz of the overall optical interferometer type branching component is given by the following equation.

$$Cmz = \sin^2(\psi 1 + \psi 2) \cdot (1 + \cos\theta)/2 + \sin^2(\psi 1 - \psi 2) \cdot (1 - \cos\theta)/2 \quad (4)$$

where $\Psi 1$ and $\Psi 2$ are parameters that represent the coupling characteristics of the two directional couplers: the coupling ratios of the two directional couplers are specified by $\sin^2\Psi 1$ and $\sin^2\Psi 2$, respectively.

The first term of the equation (4) is similar to the equation (3), the wavelength dependence of which can be reduced by using the principle described above. In the equation (4), further adjustment of the wavelength dependence is possible by utilizing the second term thereof when $\Psi 1$ is not equal to $\Psi 2$. The next embodiment is an example of when $\Psi 1$ is not equal to $\Psi 2$.

EMBODIMENT 4

Figure 7:
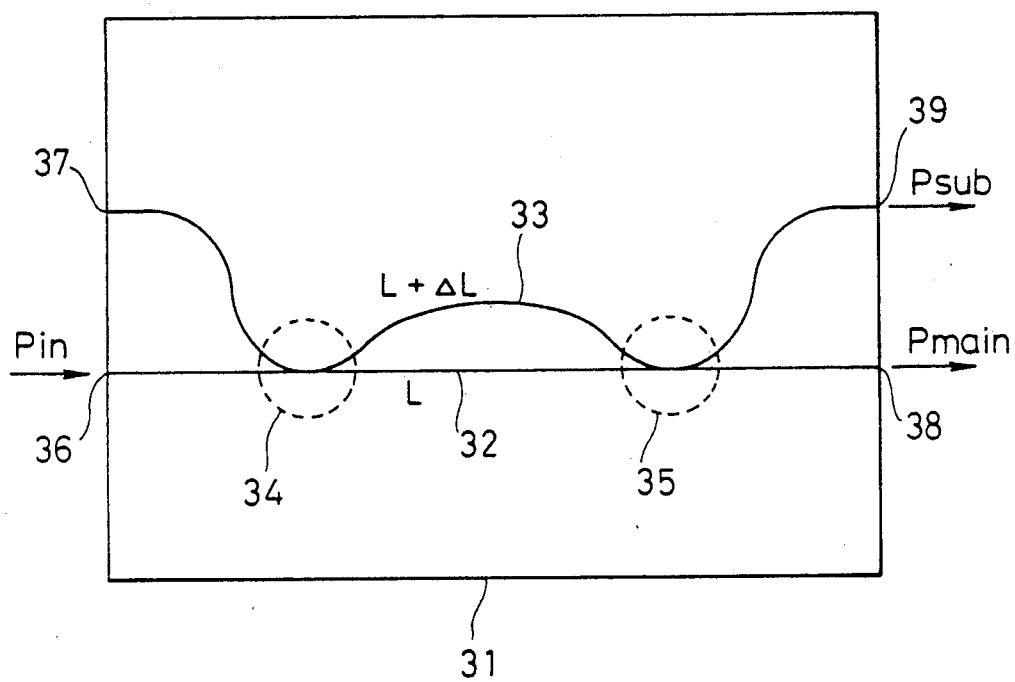
FIG. 7 is a planar view showing the basic configuration of a guided-wave optical branching component of the present invention.
Figure 8A:
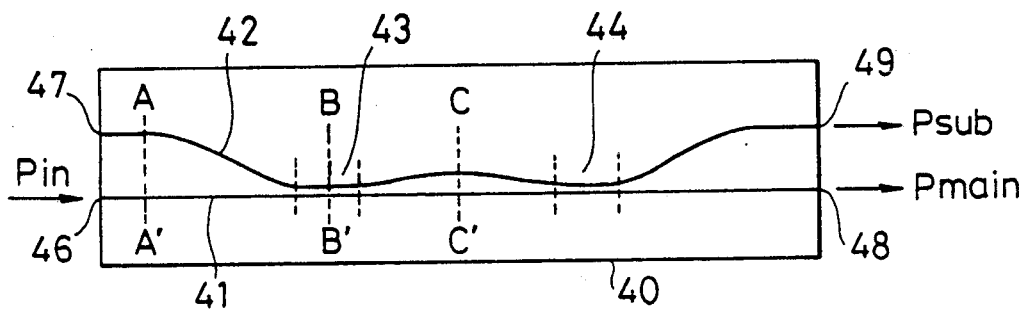
FIG. 8A is a planar view showing a configuration of the guided-wave optical branching component according to the first embodiment of the present invention.
Figure 8B:
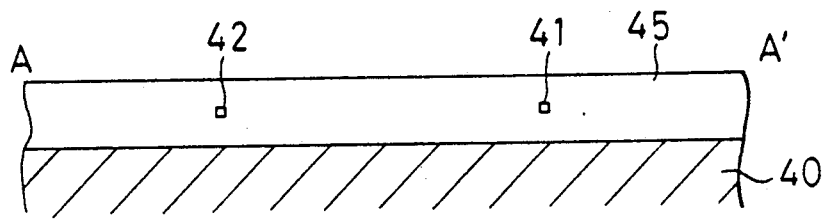
FIG. 8B is a cross-sectional view taken along the line A-A' in FIG. 8A.
Figure 8C:
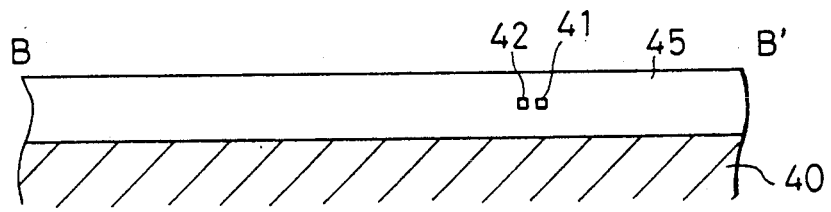
FIG. 8C is a cross-sectional view taken along the line B-B' in FIG. 8A.
Figure 8D:
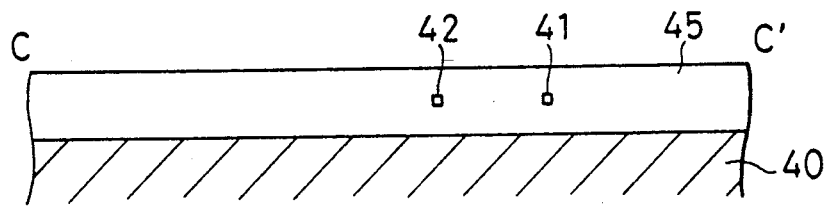
FIG. 8D is a cross-sectional view taken along the line C-C' in FIG. 8A.
Figure 14:
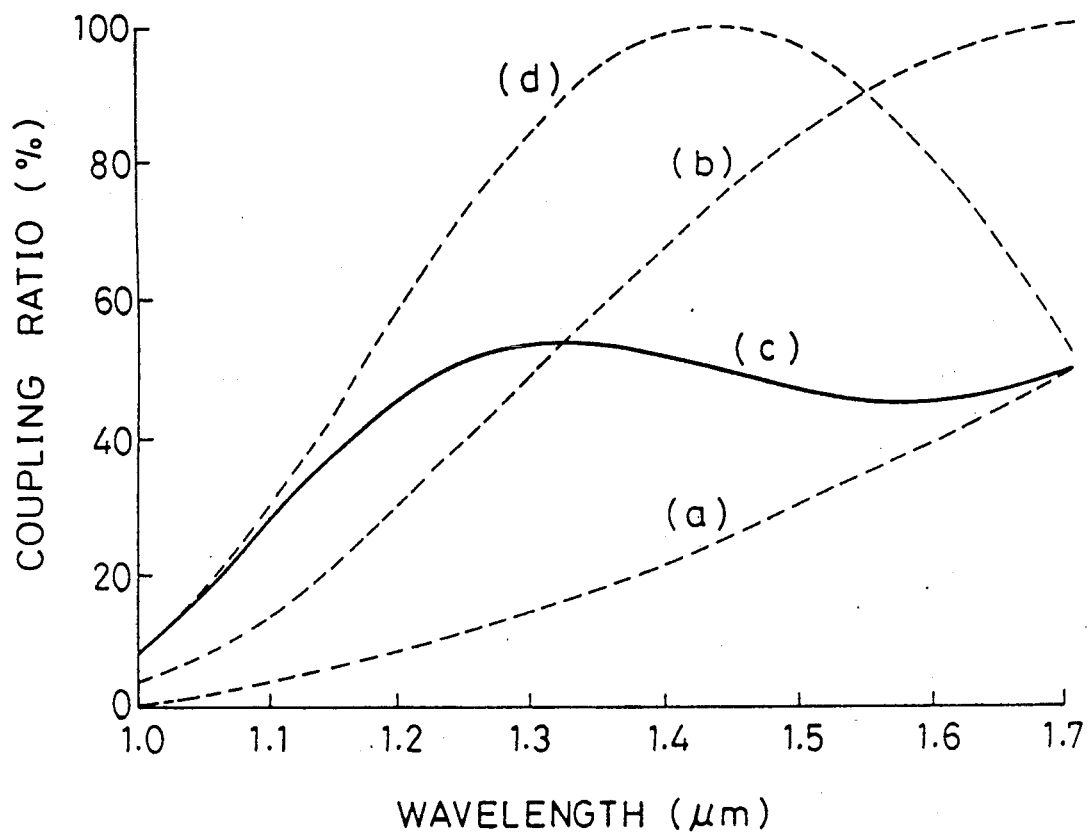
FIG. 14 is a graph showing the wavelength dependence of the coupling ratio of the guided-wave optical branching component according to the fourth embodiment of the present invention.

FIG. 14 is a characteristic graph showing the wavelength dependence of the coupling ratio of the optical branching component which uses, as the directional couplers 43 and 44 shown in FIGS. 7 and 11, two directional couplers having different characteristics from each other. In FIG. 14, curve (a) shows coupling characteristics of a first directional coupler 43, and curve (b) shows coupling characteristics of a second directional coupler 44 whose coupling intensity is twice as great as that of the directional coupler 43. Curve (c) shows the coupling characteristics of the overall Mach-Zehnder optical branching component when the value (n·ΔL) between the directional couplers 43 and 44 is set to 1 μm. Curve (d) shows the coupling characteristics of the overall Mach-Zehnder optical branching component when the value (n·ΔL) between the directional couplers 43 and 44 is set to 0.0 μm. The curve (c) shows that the optical branching component of the embodiment maintains a coupling ratio with little wavelength dependence of 50% ±5% in the wide wavelength region of 1.2 μm to 1.7 μm.

Incidentally, exchanging the characteristics of the two directional couplers 43 and 44 can produce an optical branching component of the same coupling characteristics.

EMBODIMENT 5

Figure 15:
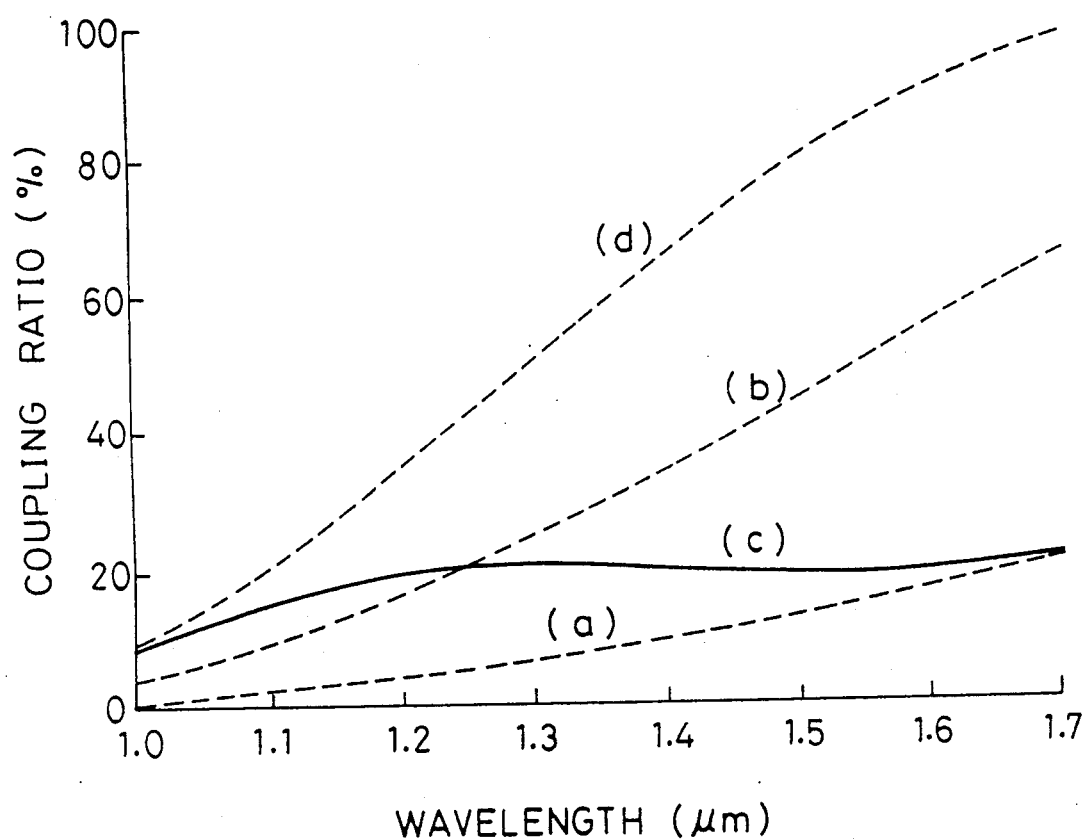
FIG. 15 is a graph showing the wavelength dependence of the coupling ratio of the guided-wave optical branching component according to the fifth embodiment of the present invention.

FIG. 15 is a characteristic graph showing the wavelength dependence of the coupling ratio of the optical branching component which uses, as directional couplers 43 and 44 shown in FIGS. 7 and 11, two directional couplers having characteristics which are different from each other. The optical branching component has an approximately 20% coupling ratio in a wide wavelength region. In FIG. 15, curve (a) shows the coupling characteristics of a first directional coupler 43, and curve (b) shows the coupling characteristics of a second directional coupler 44 whose coupling intensity is twice as great as that of the first directional coupler 43. Curve (c) shows the overall coupling characteristics of the entire Mach-Zehnder optical branching component when the effective optical-path length difference (n·ΔL) between the directional couplers 43 and 44 is specified to 0.9 μm. The curve (c) shows that the optical branching component of the embodiment maintains a coupling ratio having little wavelength dependence within 20% ±2% in a wide wavelength region of 1.2 μm to 1.7 μm. Incidentally, curve (d) shows the coupling characteristics when (n·ΔL) is deliberately specified to 0 μm. The coupling ratio depicted by the curve (d) has a large degree of wavelength dependence.

Figure 16:
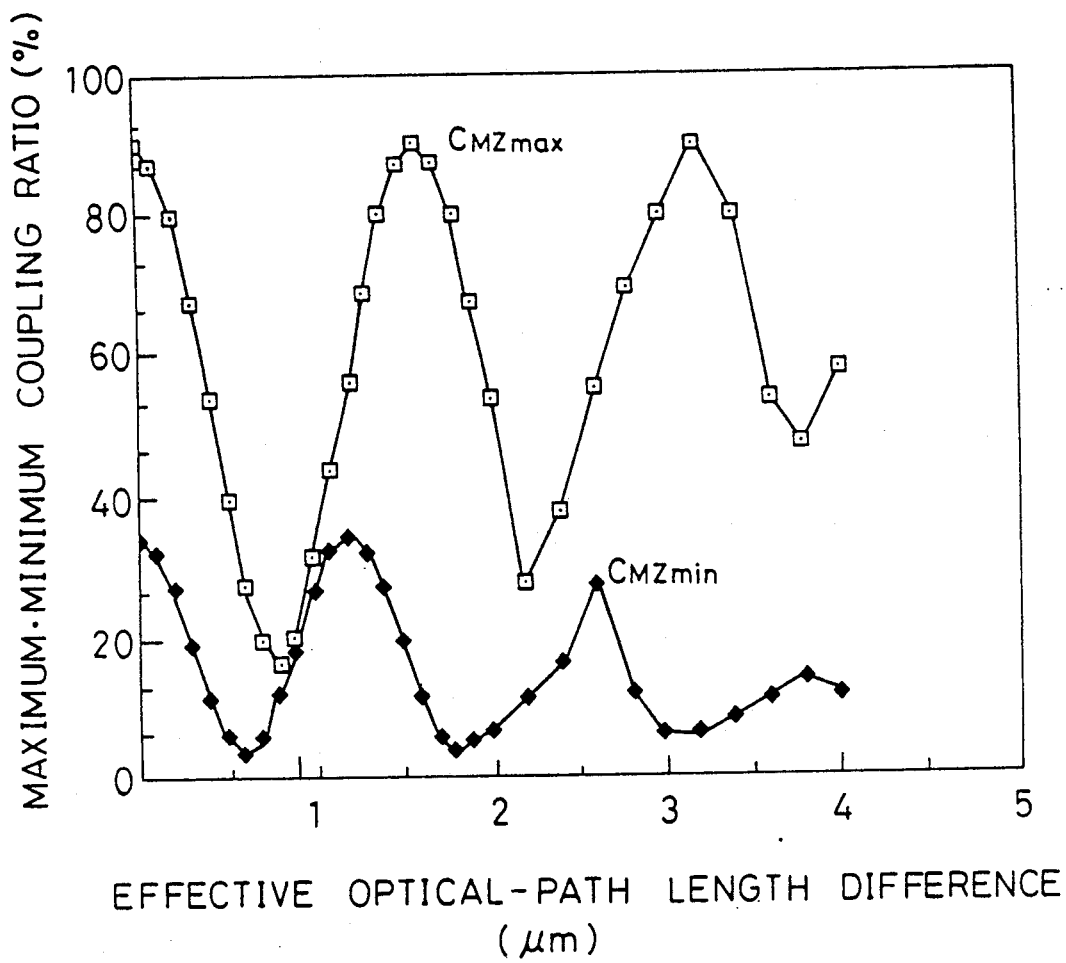
FIG. 16 is a graph illustrating the importance of the appropriate setting of the effective optical-path length difference (n·ΔL) in the fifth embodiment.

FIG. 16 is a graph illustrating the importance of the appropriate setting of the effective optical-path length difference (n·ΔL) in this embodiment. In FIG. 16, the maximum values Cmzmax and the minimum values Cmzmin of the coupling ratio Cmz obtained by theoretical calculations are plotted as a function of the effective optical-path length differences in the wavelength region of 1.2 μm to 1.6 μm. From FIG. 16, it is well understood that the wavelength dependence of the coupling ratio can be reduced in the above wavelength region only when the effective optical wavelength difference is around 0.9 μm at which both Cmzmax and Cmzmin approach a desired coupling ratio of 20%.

Better flat coupling characteristics can be obtained when the coupling characteristics of the two directional couplers 43 and 44 are different rather than when the coupling characteristics are the same. This is understood by comparing the first embodiment (FIG. 9) and the fourth embodiment (FIG. 14), or the second embodiment (FIG. 12) and the fifth embodiment (FIG. 15).

The preceding embodiments deal with optical branching components in which two directional couplers are connected together through two optical waveguides the lengths of which are different by ΔL. The conception of the present invention, however, can be extended to an optical branching component in which N directional couplers are connected in a serial fashion by optical waveguides, and the optical wavelength differences ΔLi (i=1, 2, ..., N-1) are provided between respective adjacent directional couplers. The next embodiment is an example of when N=3.

EMBODIMENT 6

Figure 17:
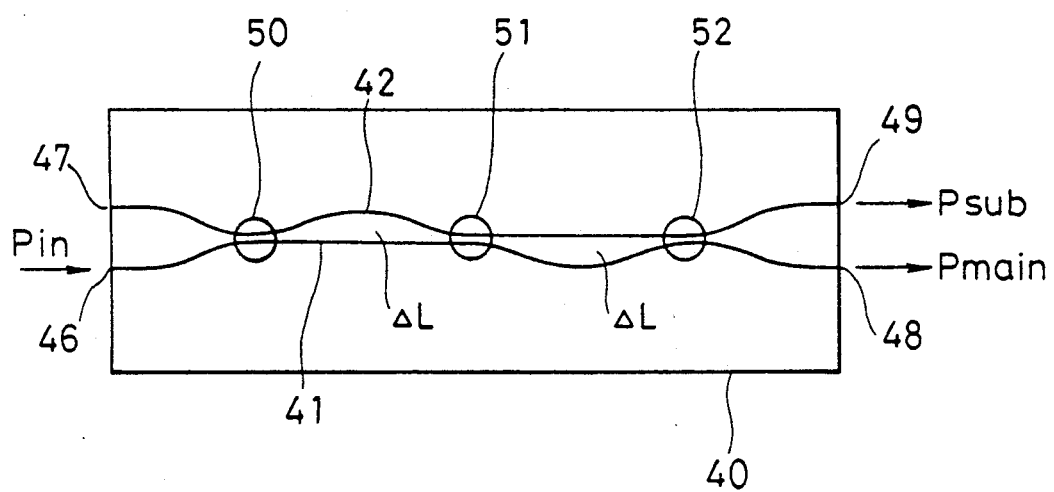
FIG. 17 is a planar view showing a configuration of a guided-wave optical branching component according to the sixth embodiment of the present invention.
Figure 18:
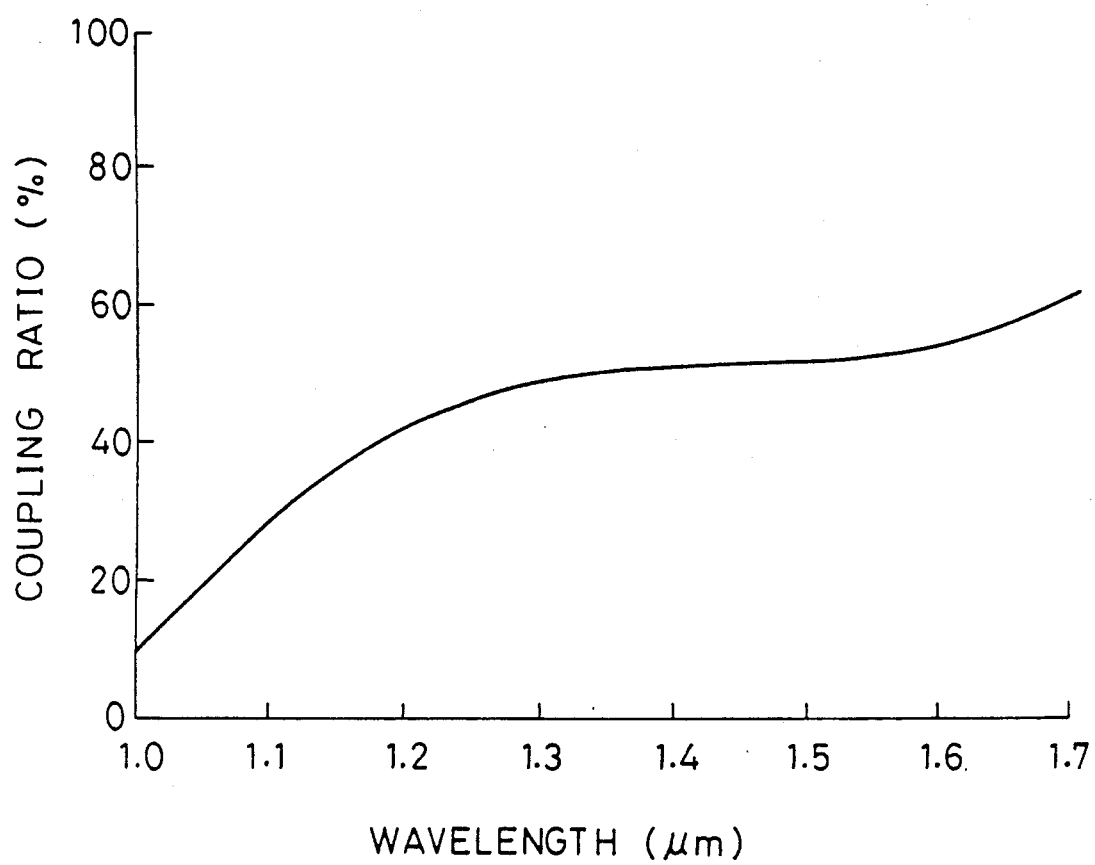
FIG. 18 is a graph showing the wavelength dependence of the coupling ratio of the guided-wave optical branching component according to the sixth embodiment of the present invention.

FIG. 17 is a planar view showing the configuration of a 50% coupling optical branching component according to the sixth embodiment of the present invention, in which N=3 directional couplers are used, and FIG. 18 is a graph showing the coupling characteristics of the branching component. In FIG. 17, two optical waveguides 41 and 42 are brought into close proximity at three positions so as to constitute three directional couplers 50, 51, and 52. In this embodiment, each of the three directional couplers has the same characteristic as that of the directional couplers 43 and 44 of the first embodiment. Between the directional couplers 50 and 51, the effective optical-path length of the optical waveguide 42 is specified to be longer than that of the waveguide 41 by $n \cdot \Delta L = 0.88$ $\mu$m, whereas between the directional couplers 51 and 52, the effective optical-wave length of the optical waveguide 41 is set to be longer than that of optical waveguide 42 by 0.88 $\mu$m. It is found in the embodiment of FIG. 18 that the optical branching component has a coupling ratio of 50% ±10% in the wavelength region of 1.2 $\mu$m to 1.65 $\mu$m. In particular, a flat coupling characteristic of 50% ±5% can be obtained in the wavelength region of 1.25 $\mu$m to 1.6 $\mu$m.

The number N of directional couplers can be increased. Moreover, directional couplers whose characteristics are different can be used to constitute the optical branching component.

Although all the preceding embodiments deal with 2-branching components, the present invention can also be applied to multi-branching components. Next is described an embodiment of a 4-branching component.

EMBODIMENT 7

Figure 19:
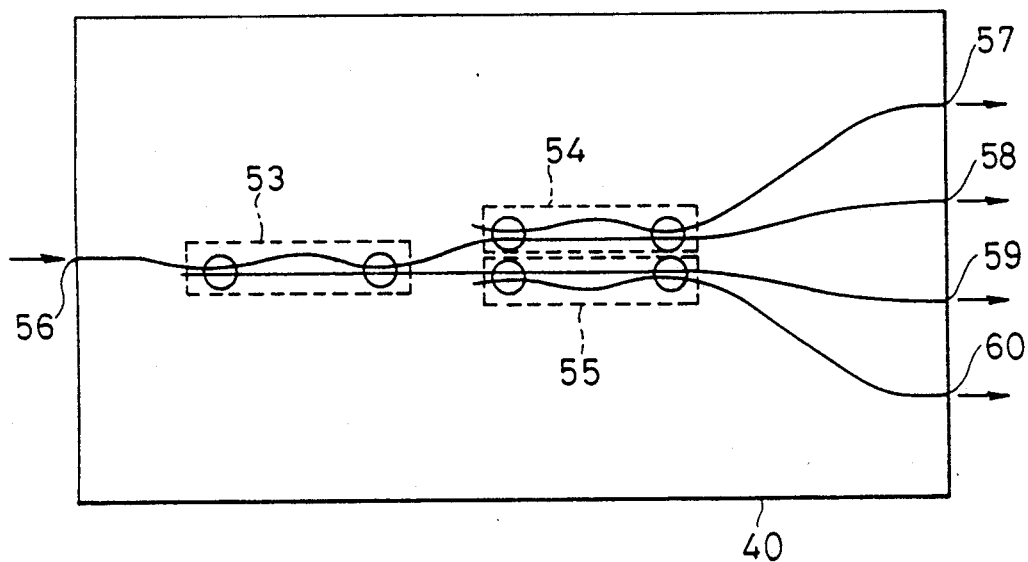
FIG. 19 is a planar view showing a configuration of a 4-branching component according to the seventh embodiment of the present invention.

FIG. 19 is a planar view showing a configuration of a 4-branching component according to the seventh embodiment of the present invention. In FIG. 19, three 2-branching components 53, 54, and 55 are formed on a substrate 40. Each 2-branching component is a 50% coupling optical branching component like those of the forth embodiment in FIG. 14. One input port 56 and four output ports 57, 58, 59 and 60 are provided. The optical signal launched into the input port 56 is divided into two equal parts by the optical branching component 53, is further divided by the optical branching components 54 and 55, and then is outputted from the output ports 57, 58, 59 and 60. This configuration can provide a 4-branching component of little wavelength dependence: the variation of the coupling ratio with regard to each output port in the wavelength region of 1.25 $\mu$m to 1.6 $\mu$m is low, 25% ±5%. Incidentally, the size of the substrate 40 is approximately 50 mm × 5 mm, and the separation between the adjacent output ports is 250 $\mu$m so as to match the pitch of an optical fiber array.

EMBODIMENT 8

Figure 20:
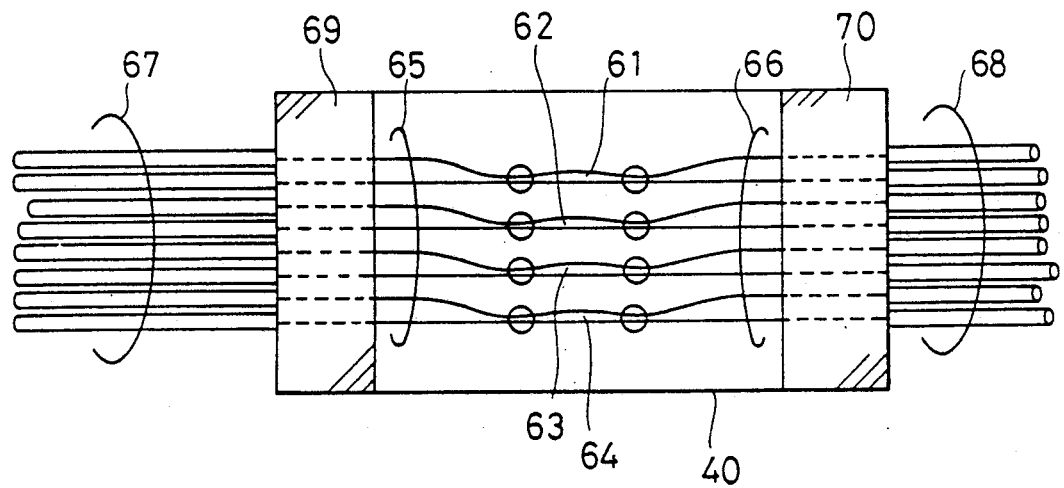
FIG. 20 is a planar view showing a configuration of a guided-wave optical branching component array according to the eighth embodiment of the present invention.

FIG. 20 is a planar view showing a configuration of a guided-wave optical branching component array that can operate in a wide wavelength region. Each of the four 50%-coupling branching components 61, 62, 63, and 64 has a construction similar to those of the fourth embodiment, and these components 61-64 are arranged in a parallel fashion. An input port array 65 and an output port array 66, an input fiber array 67 and an output fiber array 68, and input fiber array terminals 69 and output fiber array terminals 70 are provided. The fiber array pitch in the array terminals 69 and 70, and waveguide pitch of the input and output port array 65 and 66 are specified to 250 $\mu$m. The substrate 40 of the embodiment is small, the size being 25 mm × 5 mm, taking advantage of guided-wave type optical components in that a number of the components can be formed on a single substrate.

In the embodiments described above, the optical branching components are formed using silica-based ($SiO_2$-$TiO_2$) optical waveguides. However, the substrates are not restricted to silicon substrates: substrates of silica glass can also be used. Furthermore, $SiO_2$-$GeO_2$-based optical waveguides, which use $GeO_2$ as the main dopant of the core, can also be used. Moreover, the present invention can be applied not only to silica-based optical waveguides but also to waveguides of other materials such as multi-component glass system or lithium niobate system.

Furthermore, although in the preceding embodiments, ($n \cdot \Delta L$) is specified as the difference of lengths of the two optical waveguides connecting the two directional couplers, other methods can be used: for example, the effective optical-path length difference can be provided by slightly changing the refractive indices of the two waveguides while maintaining the lengths of the two optical waveguides to be identical. More specifically, a thin film heater provided on the optical waveguide between the directional couplers can change the refractive index of the optical waveguide by means of the thermo-optical effect, and thereby can adjust the effective optical-path length difference, thus achieving a desired optical branching component. In addition, the wavelength dependence of the coupling ratio can be switched so as to change the wavelength dependence between large and small values thereof. This can be carried out by turning on and off the thin film heater provided on either the longer or shorter waveguide to alter the effective optical-path length initially set to $\Delta L$.

An example of the optical branching component having a variable coupling ratio will be described in the following embodiment.

EMBODIMENT 9

Figure 21A:
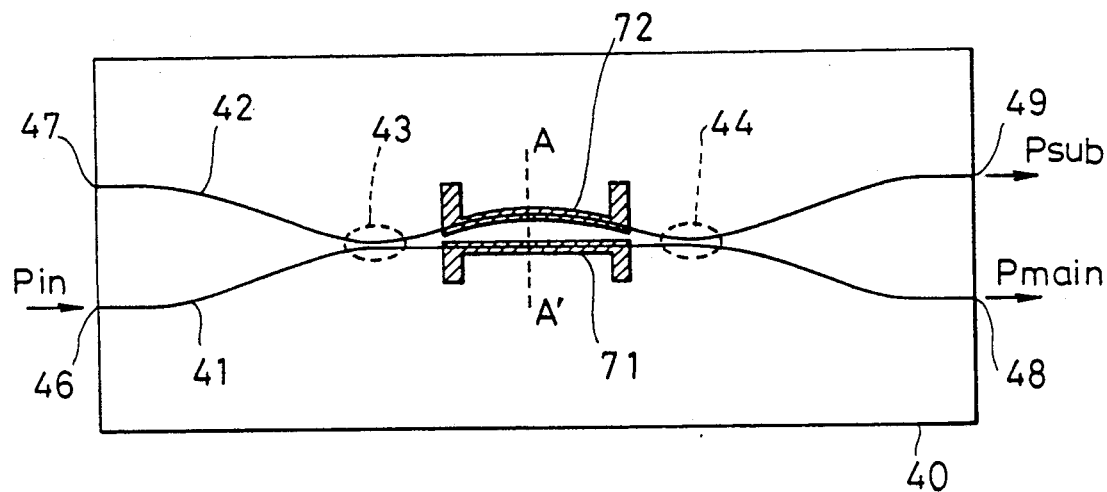
FIG. 21A is a planar view showing a configuration of a guided-wave optical branching component (variable coupling ratio type component) according to the ninth embodiment of the present invention.
Figure 21B:
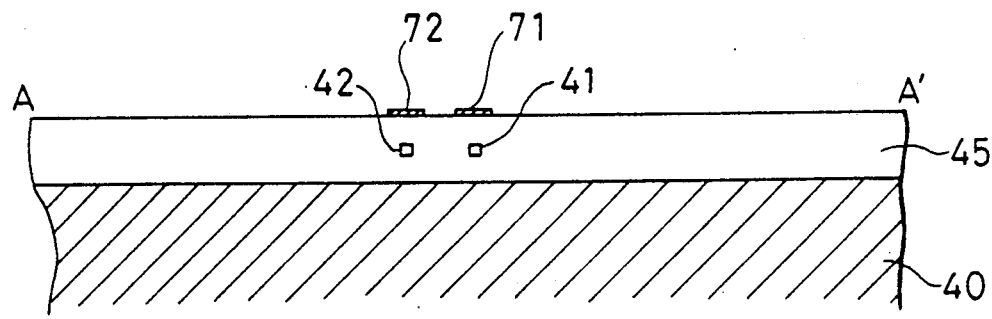
FIG. 21B is a cross-sectional view taken along the line A-A' in FIG. 21A.

FIGS. 21A and 21B show the ninth embodiment of the present invention. This embodiment differs from the second embodiment shown in FIG. 11 in that two thin film heaters 71 and 72 are provided on cladding layer 45 formed on the two optical waveguides 4I and 42 connecting the two directional couplers 43 and 44. The thin film heaters 71 and 72 are made of chromium (Cr) thin film which is 0.5 $\mu$m thick, 20 $\mu$m wide, and 2.5 mm long. When an electric current is not supplied to the thin film heaters 71 and 72, the optical coupling component of this embodiment operates as a 20% coupling component whose wavelength dependence is reduced like the coupling component of the second embodiment. In contrast, when an electric current is supplied to the thin film heater 71 formed on the optical waveguide 41 having the shorter optical-path length between the two directional couplers, the temperature of the portion of optical waveguide 41 just under the heater is elevated, and the effective refractive index in that portion slightly increases. Thus, the increase in the effective optical-path length of the optical waveguide 41 by the thermo-optical effect, decreases the effective optical-path length difference from the initial difference of 0.9 $\mu$m before current was supplied, which in turn changes the overall coupling ratio of the entire optical coupling component.

Figure 22A:
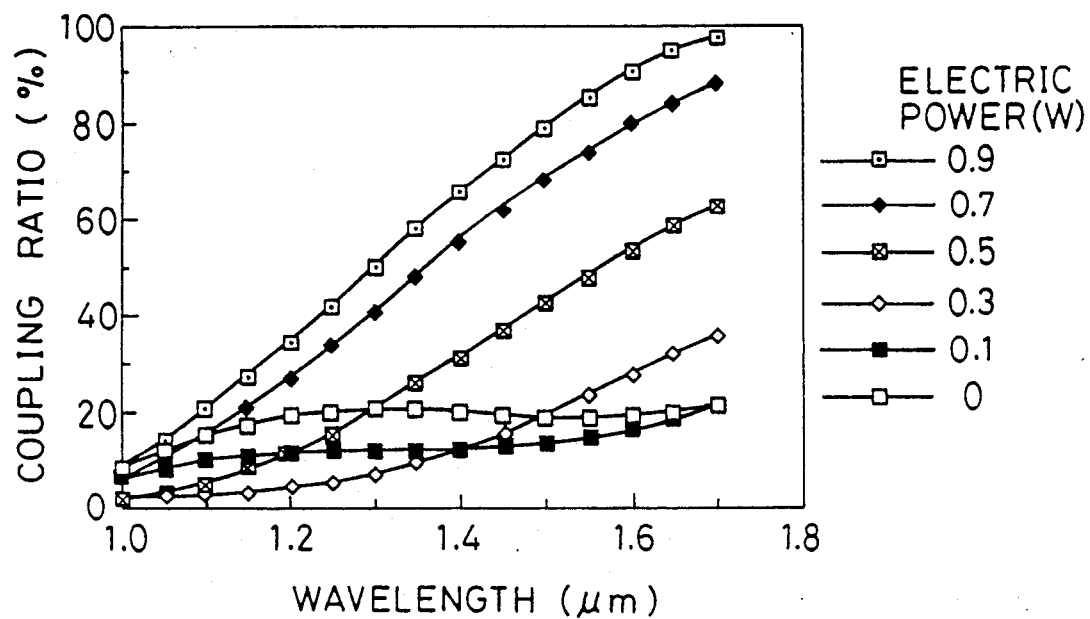
FIGS. 22A and 22B are graphs each showing the wavelength dependence of the coupling ratio of the guided-wave optical branching component according to the ninth embodiment of the present invention.

FIG. 22A is a graph in which wavelength dependencies of the coupling ratios of the optical branching component of the embodiment are plotted using various electric powers supplied to the thin film heater 71 as parameters (0 W, 0.1 W, 0.3 W, 0.5 W, 0.7 W, and 0.9 W). When the applied power is 0 W, the 20% coupling ratio is obtained in the wide wavelength region of 1.2 $\mu$m to 1.7 $\mu$m just as in the optical branching component of the second embodiment. When the power is 0.1 W, the coupling ratio decreases to approximately 10%. When the power is 0.3 W to 0.9 W, the wavelength dependence of the coupling ratio gradually increases, and the coupling ratio reaches near 100% at approximately 1.65 $\mu$m. The effective optical-path length difference between the two directional couplers 43 and 44 is considered, by comparison with theoretical calculations, to be decreased to nearly zero when the power is 0.9 W.

Figure 22B:
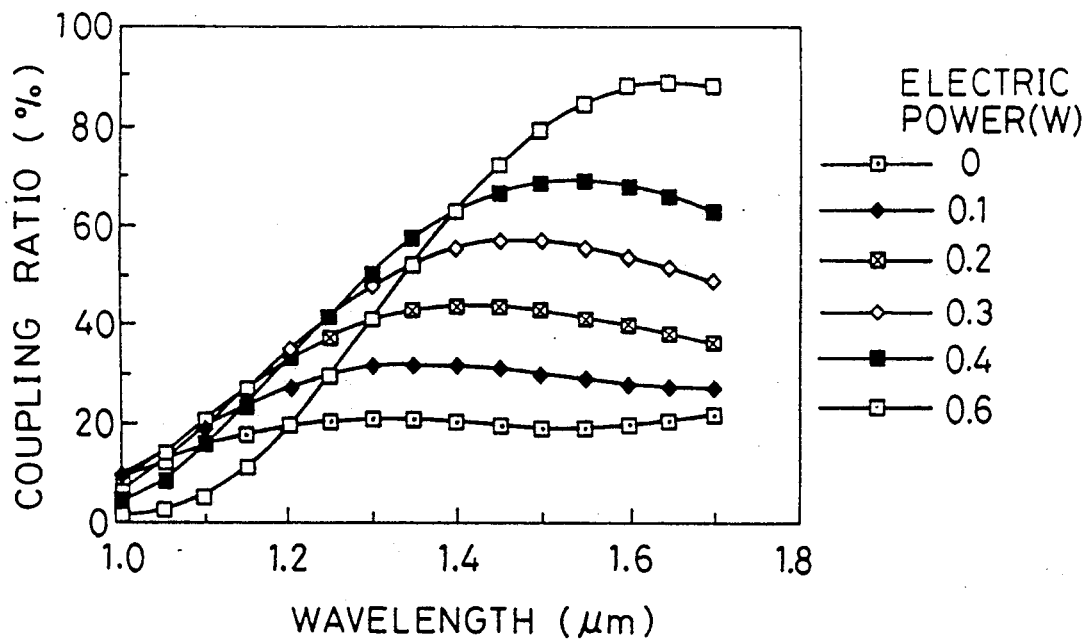

FIG. 22B, in contrast to FIG. 22A, is a graph showing wavelength dependencies of the coupling ratios when the thin film heater 72 provided on the optical waveguide 42 is supplied with an electric current. The wavelength dependencies are plotted using electric powers supplied to the thin film heater 72 as parameters (0 W, 0.1 W, 0.2 W, 0.3 W, 0.4 W, and 0.6 W). With the increase of the power, the coupling ratio increases from the initial value of 20% to about 40%, and the wavelength dependence gradually increases. The effective optical-path length difference between the two directional couplers 43 and 44 is considered, by comparison with theoretical calculations, to be increased to approximately 1.5 $\mu$m when the power is 0.6 W.

The optical branching component of the embodiment with the thin film heaters, as is clearly seen from the experimental results shown in FIGS. 22A and 22B, can operate as a tunable coupling component, the coupling characteristics of which can be adjusted on a small or large scale by regulating the currents supplied to the thin film heaters.

In the preceding embodiments, all the optical branching components are constructed using optical waveguides formed on planar substrates as basic elements. The present invention, however, is not limited to an optical branching component utilizing the planar optical waveguides. The following embodiment uses optical fibers as optical waveguides.

EMBODIMENT 10

Figure 23A:
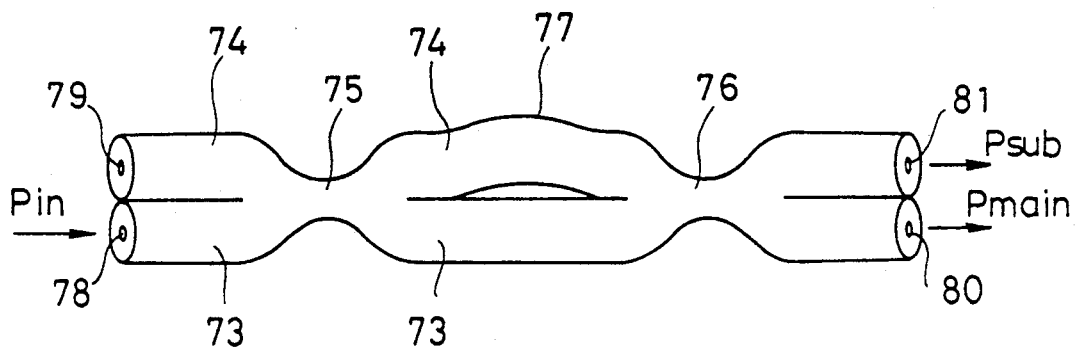
FIGS. 23A and 23B are views each showing a configuration of a guided-wave optical branching component (extension to fiber type component) according to the tenth embodiment of the present invention.
Figure 23B:
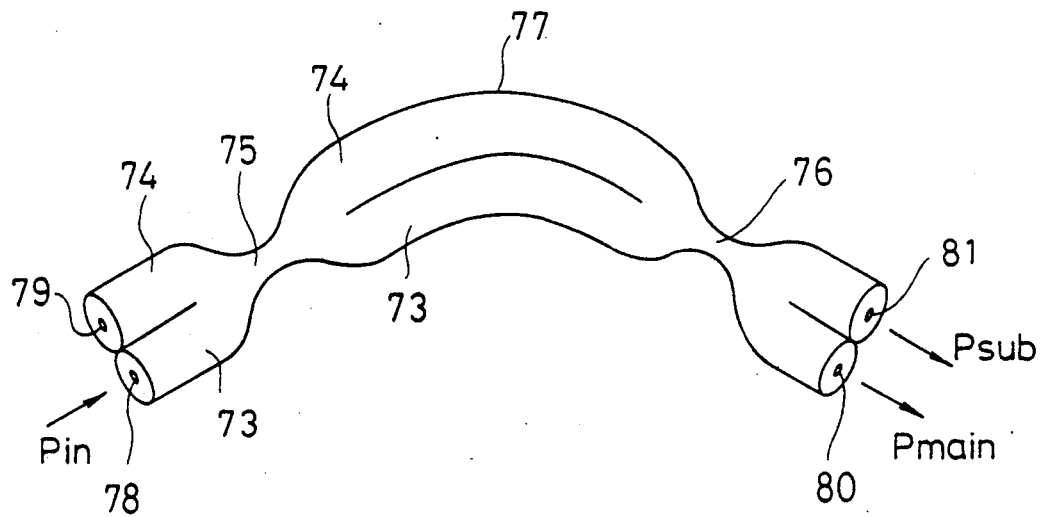

FIGS. 23A and 23B illustrate configurations of optical branching components of the tenth embodiment of the present invention, which are made of fibers and operate in a wide wavelength region. These branching components are basically composed of two single-mode optical fibers 73 and 74. The two single-mode optical fibers 73 and 74 are fused and elongated at two portions, thus forming two directional couplers 75 and 76. The lengths of the two optical fibers 73 and 74 connecting the directional couplers 75 and 76 are slightly different: the effective optical-path length of the optical fiber 74 is slightly longer than that of the optical fiber 73 by approximately 1 $\mu$m, which characterizes the present invention. The effective optical-path length difference part 77 is achieved by slightly curving the optical fiber 74 in FIG. 23A, and by curving the two optical fibers between the directional couplers in FIG. 23B. Since the optical-path lengths are relative, optical fiber 73 may be curved instead of fiber 74 in FIG. 23A.

In FIGS. 23A and 23B, the directional couplers 73 and 74 play the role of directional couplers 43 and 44 in the first embodiment, and constitute an optical interferometer with input ports 78, 79 and output ports 80 and 81. These configurations can function as optical branching components, the wavelength dependence of which can be reduced. In this case, it should be noted that the lengths of optical fibers between the directional couplers 75 and 76 must be specified to be as short as possible. The stable operation of the optical branching component with the reduced wavelength dependence cannot be achieved when the lengths of the optical fibers between the directional couplers 75 and 76 exceed 1 cm, or when the entire optical interferometer including the directional couplers 75 and 76 are not firmly fixed in a single package. It is not desirable that individually packaged two fiber type directional couplers be connected via two fibers of several tens of centimeters so as to construct the optical branching component of the embodiment. In such a configuration, stable operation of the optical branching component cannot be achieved because of the unexpected fluctuation of the minute effective optical-path length difference due to the swing of the optical fibers between the two directional couplers or due to the temperature change.

Heretofore, the embodiments of the guide-wave type (2×2) optical branching components are described. Next, guided-wave type (3×3) optical branching components will be described in embodiments 11 to 13.

EMBODIMENT 11

Figure 24A:
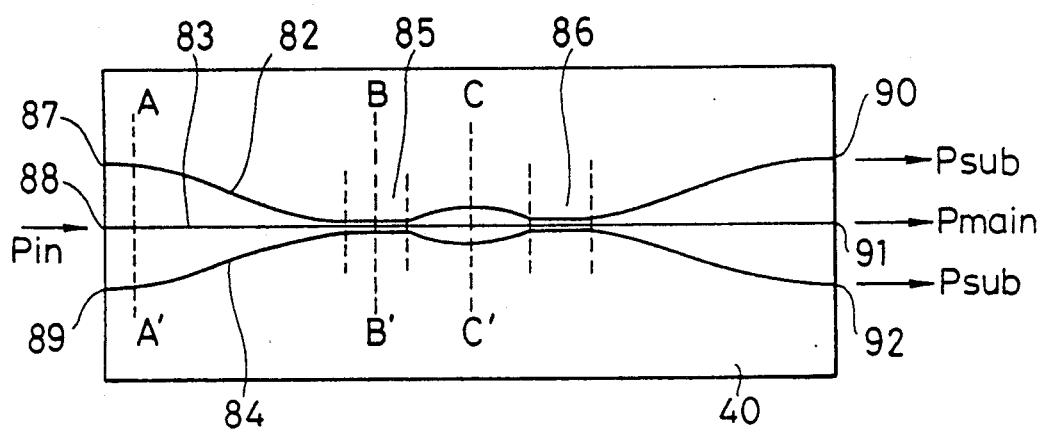
FIG. 24A is a planar view showing a configuration of the guided-wave (3×3) optical branching component according to the eleventh embodiment of the present invention.
Figure 24B:
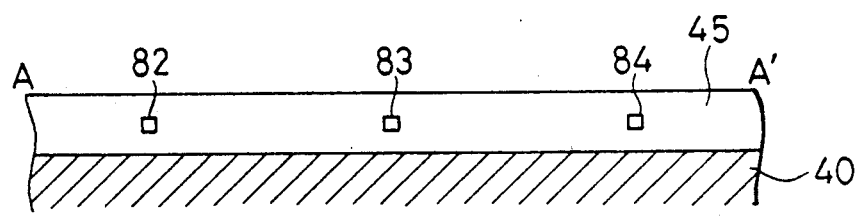
FIG. 24B is a cross-sectional view taken along the line A-A' in FIG. 24A.
Figure 24C:
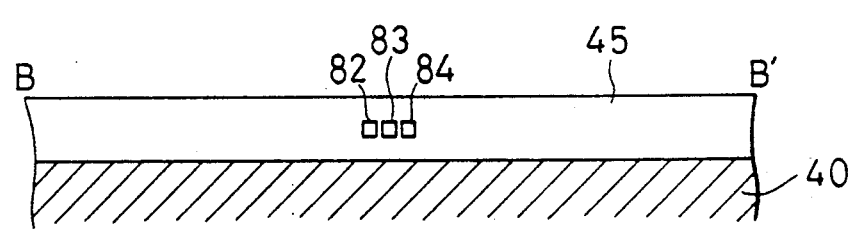
FIG. 24C is a cross-sectional view taken along the line B-B' in FIG. 24A.
Figure 24D:
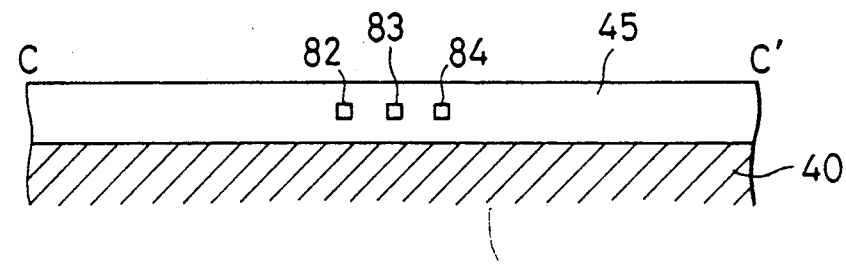
FIG. 24D is a cross-sectional view taken along the line C-C' in FIG. 24A.

FIGS. 24A–24D are views showing a configuration of the guided-wave (3×3) optical branching component, the coupling ratio Ci of which is designed to be 33%±5% in the wavelength region of $\lambda 1 = 1.2$ $\mu$m to $\lambda 2 = 1.6$ $\mu$m: FIG. 24A is a planar view thereof; FIGS. 24B, 24C, and 24D are enlarged cross-sectional views taken along the lines A-A', B-B', and C-C' in FIG. 24A, respectively.

A substrate 40 is a silicon substrate, and optical waveguides 82, 83 and 84 are silica-based optical waveguides formed on the silicon substrate 40 using silica-based glass materials. The optical waveguides 82, 83 and 84 are placed side by side in close proximity at two positions on the substrate, thus forming directional couplers 85 and 86.

The optical waveguides 82, 83 and 84 are composed of $SiO_2$-$TiO_2$-based glass cores each of which has a cross section of about 8 $\mu$m × 8 $\mu$m, and is embedded in a cladding layer 45 of about 50 $\mu$m thick made of $SiO_2$-based glass. The 3-waveguide type Mach-Zehnder interferometer circuit is constructed by combining linear patterns and arc patterns whose radius of curvature is 50 mm. The silica-based optical waveguides 82, 83 and 84 can be formed by means of the known combination of the glass-film deposition technique and the micro-fabrication technique: the glass-film deposition technique uses a flame-hydrolysis reaction of silicon tetrachloride and titanium tetrachloride; the micro-fabrication technique uses reactive-ion etching.

At each coupling region of directional couplers 85 and 86, the three optical waveguides 82, 83, and 84 are separated by 4 $\mu$m, and are placed in parallel over a 1.2 mm long.

The input ports 87, 88 and 89 are separated by 0.250 mm, and the output ports 90, 91 and 92 are also separated by 0.250 mm. The waveguide lengths of the respective optical waveguides 82, 83 and 84 between the two directional couplers 85 and 86 are: L with regard to the optical waveguide 83; and L+ΔL with regard to the optical waveguides 82 and 84. The effective optical-path length difference (n·ΔL) is set to 1.15 μm. Here, ΔL assumes a value of 0.79 μm, because the refractive index n of the silica-based optical waveguides is approximately 1.45. ΔL can be accurately set at the photolithographic mask pattern step by using a slight difference in the lengths of curved waveguide and straight waveguide between the two directional couplers 85 and 86 in FIG. 24A.

The optical-path lengths of the optical waveguides 82 and 83, and those of the optical waveguides 83 and 84 between the two directional couplers 85 and 86 are different from each other by a small quantity ΔL. The optical-path length difference ΔL of the 3-pencil type Mach-Zehnder interferometer produces a phase difference Θ between the two directional couplers 85 and 86, and the phase difference Θ is given by $$\Theta = 2\pi \cdot n \cdot \Delta L / \lambda \qquad (5)$$

where n = refractive index of the optical waveguides; and λ = wavelength. The power coupling ratio Ci of the overall 3-pencil type Mach-Zehnder-interferometer in FIG. 24A can be expressed as $$Ci = Psub/(Pmain + 2\ Psub) \qquad (6)$$

and is given by $$Ci = 2\cos^2(\Theta/2)\cdot\sin^2\Psi\cdot[1 - \cos^2(\Theta/2)\cdot\sin^2\Psi] \qquad (7)$$

where Ψ is the variable that defines the coupling ratio of a single (3×3) directional coupler 85 or 86.

For reference, when Θ=0, i.e., ΔL=0, the equation (7) is transformed into $$CiO = [\sin^2(2\Psi)]/2 \qquad (7')$$

The present invention pays particular attention to the fact that the coupling term $\sin^2\Psi$ which specifies the wavelength dependence of the directional coupler appears in the equation (7) multiplied by the phase term $\cos^2(\Theta/2)$. In other words, the present invention is based on the principle that the wavelength dependence of the $\sin^2\Psi$ term in the equation (7) can be canceled by the wavelength dependence of the phase difference Θ in the equation (5). To achieve a desired coupling ratio of little wavelength dependence in a desired wavelength region by canceling the wavelength dependence of the $\sin^2\Psi$ term by that of the $\cos^2(\Theta/2)$ term, it is necessary to appropriately determine the wavelength dependence of the coupling ratio C of a single directional coupler 85 or 86, and to properly specify the difference (n·ΔL) by considering the equation (7).

Figure 25:
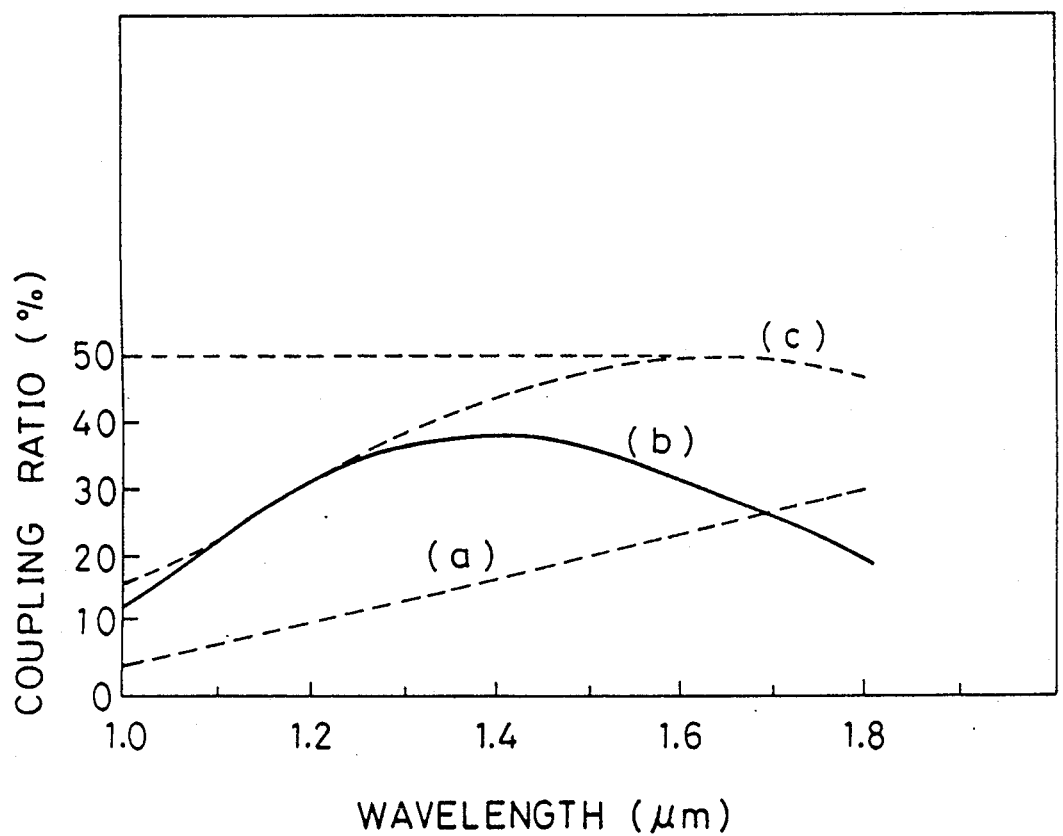
FIG. 25 is a graph showing the wavelength dependence of the coupling ratio of the guided-wave optical branching component of the eleventh embodiment.

FIG. 25 is a graph illustrating the wavelength dependence of the coupling ratio Ci of the optical branching component of the embodiment: curve (a) shows the coupling ratio characteristics of a single directional coupler 85 or 86 which constitutes the branching component; curve (b) shows the overall coupling ratio characteristics of the Mach-Zehnder interferometer type optical branching component according to the embodiment of the present invention in which n·ΔL = 1.15 μm; curve (c) shows the coupling ratio characteristics when n·ΔL = 0.0 μm, which corresponds to the coupling ratio CiO in the equation (7').

In curves (a) and (c), the coupling ratio monotonically increases in the wavelength region of 1.3 μm to 1.55 μm with the wavelength. In curve (b), on the other hand, the coupling ratio moderately varies with a peak at approximately 1.4 μm, and is maintained within 33%±5% in the wavelength region of 1.2 μm to 1.6 μm. This is because the monotonic increase of the coupling ratio of the optical branching component of the embodiment (see curve (c)) is limited by the effect of appropriately set value (n·ΔL). In other words, the increase of $\sin^2\Psi$ term is restricted by the $\cos^2(\Theta/2)$ term in the equation (7), the value Θ of which is determined by (n·ΔL) in the equation (5). In this case, if Ψ0=n·ΔL, Θ=2π is obtained when wavelength λ is equal to λ0. Consequently, when the wavelength λ is equal to λ0 (=n·ΔL), the equation (7) is reduced to the equation (7'), and curves (b) and (c) overlap each other at this point in FIG. 25.

When λ, increases over λ0, and even over λ1, the $\cos^2(\Theta/2)$ term begins to decrease from 1, and functions so as to cancel the increase of the $\sin^2\Psi$ term.

As described above, in this embodiment, the optical-path length difference corresponding to the phase difference Θ−Θ=2πλ0/λ is provided to the two directional couplers, the coupling ratio C of which would monotonically increase to 50% if the difference did not exist, and thus provides the overall system including the two directional couplers with asymmetry produced by (n·ΔL). This in turn prevents the coupling ratio Ci of the optical branching component from reaching 50%, and hence, the maximum coupling ratio occurs in about the middle of the desired wavelength region of λ1 to λ2.

In the present invention, the effective optical-path length difference (n·ΔL) or ΔL must be set accurately: if n·ΔL deviates from the appropriate value of 1.15 μm to 1.4 μm, for example, the desired moderate variation of the wavelength dependence cannot be obtained. Thus, a high degree of accuracy better than a submicron is required in setting (n·ΔL) and ΔL. This, however, can be easily accomplished by the current photolithography technology, as mentioned above.

The (3×3) optical branching component of the embodiment is compact, the size being 25 mm long and 2.5 mm wide, and about 40 components can be simultaneously constructed on a 3-inch Si wafer substrate.

The optical power loss of the optical branching component of the embodiment is very low, approximately 0.2 dB. The total power loss of the optical branching component including the connection loss between the component and the single mode optical fibers connected to the input and output ports is approximately 0.5 dB, which is sufficiently low for practical use.

In the embodiment, the coupling ratios of the two directional couplers 85 and 86 are specified to be identical for the convenience of understanding. The present invention, however, is not restricted to this. Different coupling characteristics of the two directional couplers are better to reduce the wavelength dependence of the (3×3) optical branching component. This will be described in the following embodiment.

EMBODIMENT 12

Figure 26:
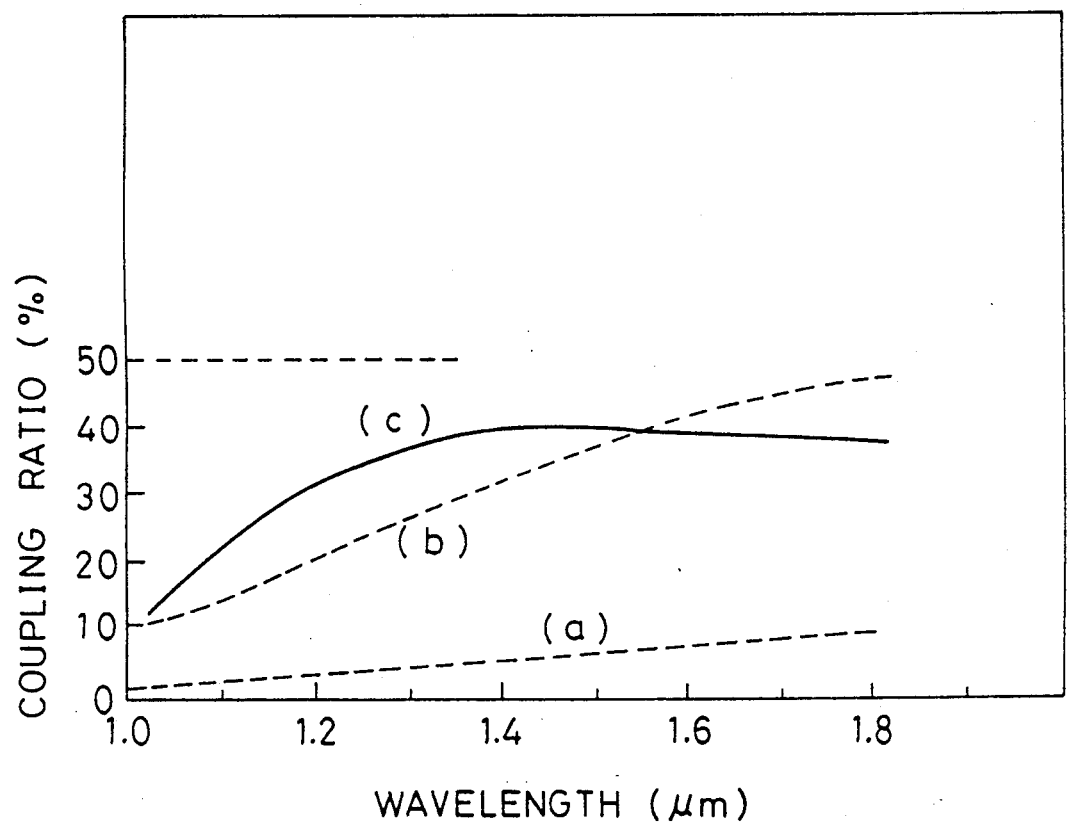
FIG. 26 is a graph showing the wavelength dependence of the coupling ratio of the guided-wave ($3\times3$) optical branching component according to the twelfth embodiment of the present invention.

FIG. 26 is a graph showing the wavelength dependence of the coupling ratio of the (3×3) optical branching component wherein two directional couplers 85 and 86 have different coupling characteristics. In FIG. 26, curve (a) shows the coupling ratio characteristics of the directional coupler 85, and curve (b) shows the coupling ratio characteristics of the other directional coupler 86, the coupling length of which is three times longer than that of the directional coupler 85. Curve (c) shows the overall coupling ratio characteristics of the 3-waveguide interferometer type (3×3) optical branching component wherein the effective optical-path length differences of optical waveguides 82 and 83, and of optical waveguides 84 and 83 are specified to (n·ΔL)=1.06 μm.

The basic structures of the directional couplers 85 and 86 are as follows:
directional coupler 85
  separation between the waveguides: 4 μm
  coupling length: 0.6 mm
directional coupler 86
  separation between the waveguides: 4 μm
  coupling length: 1.8 mm The optical branching component of the embodiment, the coupling characteristics of which are shown by the curve (c) in FIG. 26, has lower wavelength dependence, that is, has flatter coupling characteristics in a wider wavelength region than the optical branching component whose coupling characteristics are shown by the curve (b) in FIG. 25.

In the case where the two directional couplers 85 and 86 have different coupling characteristics, the equation expressing the overall coupling ratio of the optical branching component of the embodiment becomes more complicated than the equation (7). Hence, it is preferable that the roots of the coupling equation that can reduce the wavelength dependence in a particular wavelength region be obtained by numerical calculation using a computer. This, however, does not affect the fact that the appropriate setting of the effective optical-path length difference (n·ΔL) can reduce the wavelength dependencies which the directional couplers 85 and 86 originally possess.

Incidentally, the exchange in position of the two directional couplers 85 and 86 can achieve an optical branching component of the same coupling characteristics.

EMBODIMENT 13

Figure 27:
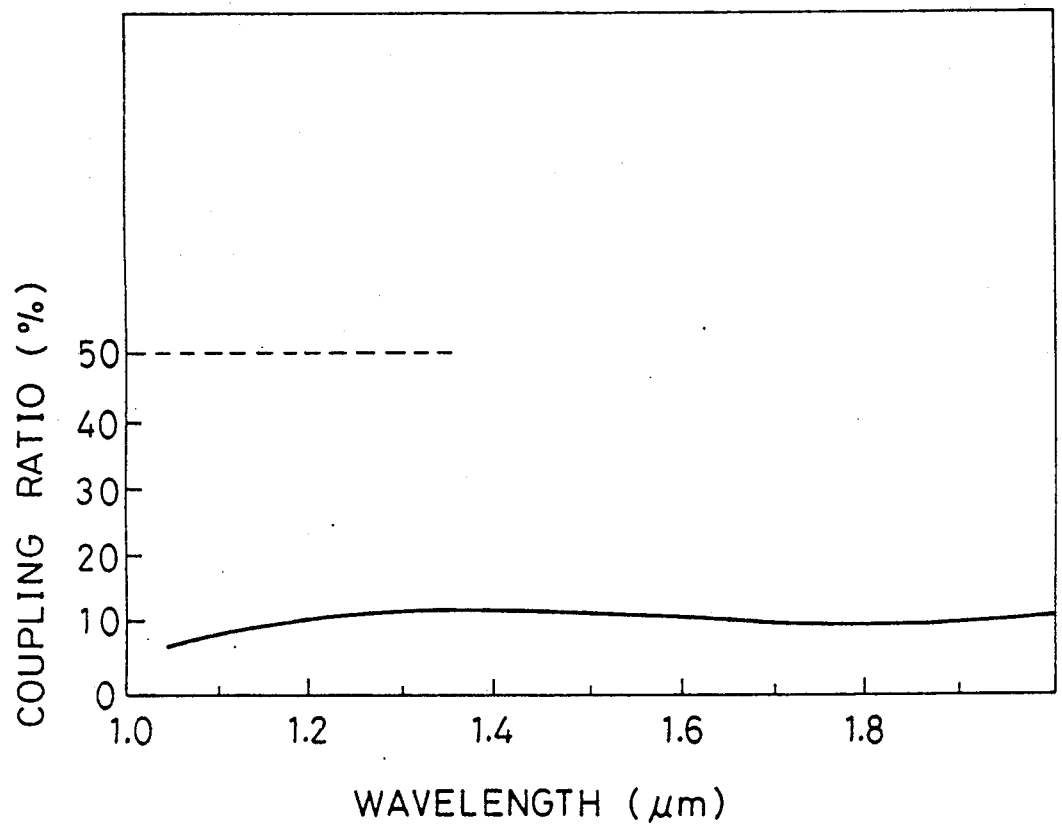
FIG. 27 is a graph showing the wavelength dependence of the coupling ratio of the guided-wave ($3\times3$) optical branching component according to the thirteenth embodiment of the present invention.

FIG. 27 shows the characteristics of the thirteenth embodiment of the present invention: it is a graph showing the wavelength dependence of the coupling ratio of the (3×3) optical branching component, the coupling ratio of which is maintained at approximately 10% in a wide wavelength region of 1.1 μm to 1.8 μm.

In this embodiment, the two directional couplers 85 and 86 have different coupling characteristics as in embodiment 12. The basic structures of the directional couplers 85 and 86 are as follows:
directional coupler 85
  separation between the waveguides: 4 μm
  coupling length: 0.6 mm
directional coupler 86
  separation between the waveguides: 4 μm
  coupling length: 1.0 mm
  effective optical-path length
  difference (n·ΔL): 1.0 μm The structural parameters of the coupling region of the directional couplers described above can be appropriately modified in consideration of various peculiarities of the fabrication processes because a directional coupler is very sensitive to structural changes.

In the preceding embodiments 11 to 13, the coupling characteristics are obtained when the optical signal is launched into the input port 88, which is an end of the center waveguide 83 of the three waveguides 82, 83 and 84. This is because such use is most general. The optical branching component of the present invention, however, can reduce the wavelength dependence even if the optical signal is launched into other input port 87 or 89. In this case, however, a great intensity difference usually appears between the optical output intensity from the output ports 90 and 91.

Moreover, in the above embodiments 11 to 13, the effective optical-path lengths of the waveguides 82 and 84 are longer than that of the waveguide 83 by (n·ΔL) between the two directional couplers. As a variation thereof, the effective optical-path lengths of the waveguides 82 and 84 are set longer than that of the waveguide 83 by (n·ΔL) and 2(n·ΔL), respectively. This can also achieve a (3×3) optical branching component wherein the wavelength dependence is reduced. In this case, it is apparent that the optical signal launched into the center input port 88 is not equally divided to output ports 90 and 92 because of lack of symmetry.

In the preceding embodiments 11 to 13, the optical waveguides 82 and 84 in the coupling region of the directional couplers 85 and 86 are symmetrical with regard to the central waveguide 83. However, the symmetry can be abandoned: for example, the separation between the optical waveguides 82 and 83 can be set wider than the separation between the optical waveguides 83 and 84, and hence, the optical output power from the output port 90 becomes less than that from the output port 92 when the optical signal is launched into the input port 88 of the central waveguide 83. In this case also, the wavelength dependence of the coupling characteristics is reduced by providing (n·ΔL).

Incidentally, the optical branching components of the present invention have a basic (3×3) structure in which 3 input ports and 3 output ports are provided. This, however, can be modified in various ways: for example, (1×3) coupler can be achieved by omitting two input ports out of three.

In the preceding embodiments described, the optical branching components are formed using silica-based ($SiO_2$-$TiO_2$) optical waveguides on the silicon substrates. However, the substrates are not restricted to silicon substrates: substrates of silica glass can also be used. Furthermore, $SiO_2$-$GeO_2$-based optical waveguides, which use $GeO_2$ as the main dopant of the core, can also be used. Moreover, the present invention can be applied not only to silica-based optical waveguides but also to waveguides of other materials such as multicomponent glass system or lithium niobate system.

Furthermore, although in the preceding embodiments, (n·ΔL) is specified as the difference of lengths of the two optical waveguides connecting the two directional couplers, other arrangements are also possible: for example, the effective optical-path length difference can be provided by slightly changing the refractive indices of the two waveguides while maintaining the lengths of the two optical waveguides to be identical. More specifically, a thin film heater provided on the optical waveguide between the directional couplers can change the refractive index of the optical-waveguide by means of the thermo-optical effect, and thereby can adjust the effective optical-path length difference, thus achieving a desired optical branching component. In addition, the wavelength dependence of the coupling ratio can be switched so as to change the wavelength dependence between the large and small values thereof. This can be carried out by turning on and off the thin film heater provide on either the longer or shorter waveguide to alter the effective optical-path length initially set to ΔL.

The above was the description of the guided-wave optical components according to the embodiments 1–13. The following is the description of guided-wave optical switches of the present invention.

EMBODIMENT 14

Figure 28A:
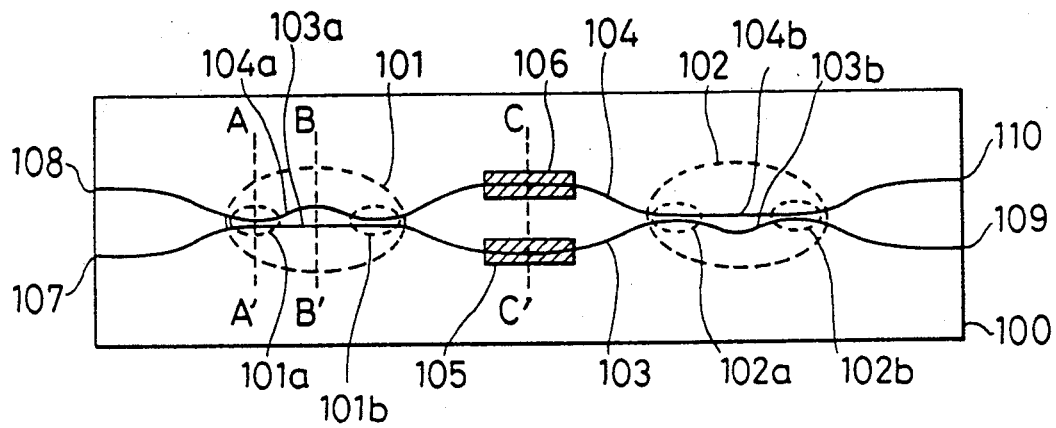
FIG. 28A is a planar view showing a configuration of the guided-wave optical switch according to the fourteenth embodiment of the present invention.
Figure 28B:
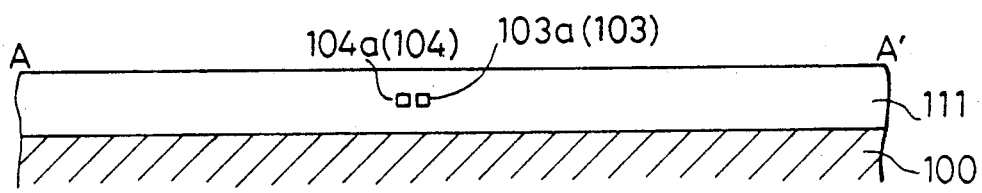
FIG. 28B is a cross-sectional view taken along the line A-A' in FIG. 28A.
Figure 28C:
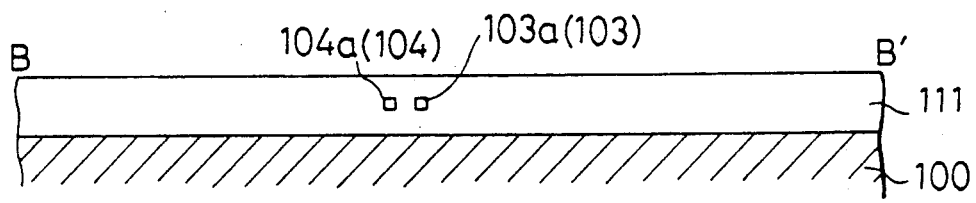
FIG. 28C is a cross-sectional view taken along the line B-B' in FIG. 28A.
Figure 28D:
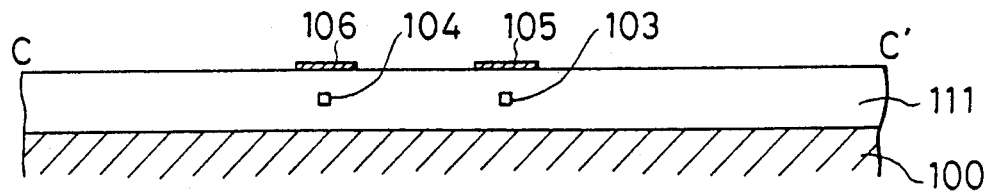
FIG. 28D is a cross-sectional view taken along the line C-C' in FIG. 28A.

FIG. 28A is a planar view showing a configuration of the guided-wave optical switch according to the fourteenth embodiment of the present invention, which is designed to function simultaneously at the wavelengths of 1.3 μm and 1.55 μm; FIGS. 28B, 28C, and 28D are enlarged cross-sectional views taken along the lines A-A', B-B', and C-C' in FIG. 28A, respectively.

Figure 5:
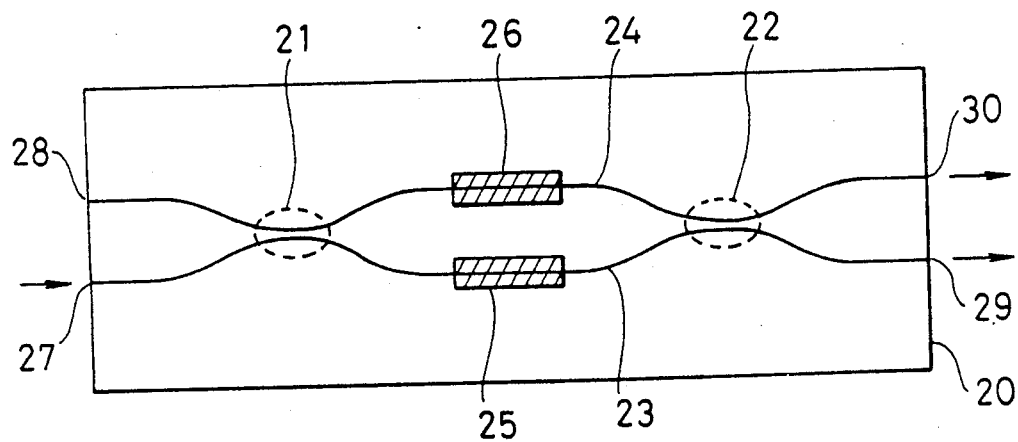
FIG. 5 is a planar view showing a configuration of a conventional guided-wave optical switch.
Figure 4:
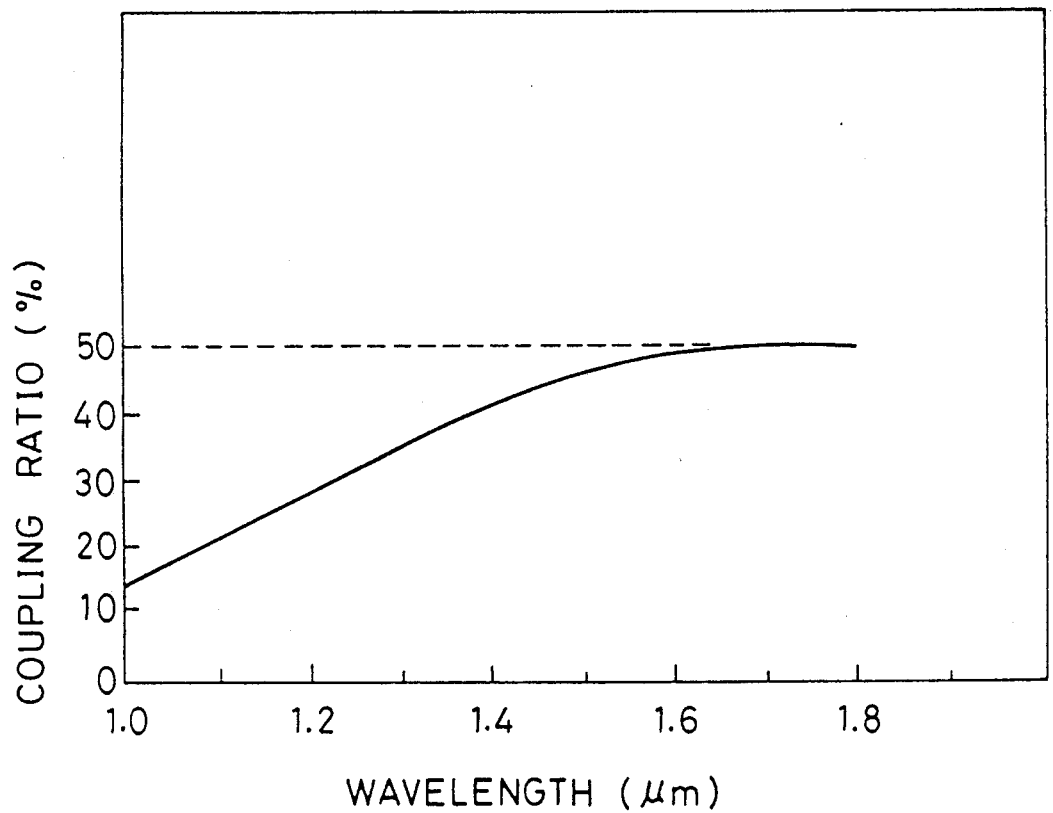
FIG. 4 is a graph showing the wavelength dependence of the coupling ratio of the conventional guided-wave (3×3) optical branching component.

On a silicon substrate 100, are formed two 3-dB optical couplers 101 and 102, and two silica-based single-mode optical waveguides 103 and 104. On the optical waveguides 103 and 104, thermo-optical effect phase shifters 105 and 106 are provided. In addition, input ports 107 and 108, and output ports 109 and 110 are provided. This embodiment differs from the conventional device shown in FIG. 5 in that each 3-dB optical coupler 101 (or 102) has the configuration of Mach-Zehnder optical interferometer including two directional couplers 101a and 101b (or 102a and 102b). In each Mach-Zehnder interferometer forming the 3-dB optical coupler 101 (or 102), an effective optical-path length difference of λ0 is provided between optical waveguides 103a and 104a (or 103b and 104b). In this case, the optical waveguides 104a and 103b having longer optical-path length in the respective 3-dB optical couplers 101 and 102 are placed in the opposite position with regard to the center line between the two waveguides 103 and 104.

The optical waveguides 103 and 104, as shown in FIGS. 28B, 28C and 28D, have cores each of which has a cross section of about 8 μm × 8 μm, and are embedded in a cladding layer 111 of about 50 μm thick placed on substrate 100. The directional couplers 101a, 101b, 102a, and 102b are formed by placing two optical waveguides 104a (104) and 103a (103), or 104b (104) and 103b (103) in close proximity of a few micrometers over a length of hundreds of micrometers, as shown in FIG. 28B. In FIG. 28C which is taken along the line B-B' in FIG. 28A, the optical waveguide 104a (104) is made longer than the optical waveguide 103a (103) to provide the optical-path length difference of λ0 between the directional couplers 101a and 101b in such a way that the optical waveguide 104a is moderately curved between the directional couplers 101a and 101b; on the other hand, the optical waveguide 103b (103) is made longer than the optical waveguide 104b (104) to provide the optical-path length difference of λ0 between the directional couplers 102a and 102b in such a way that the optical waveguide 103b is gently curved between the directional couplers 102a and 102b.

The optical-path lengths of the respective optical waveguides 103 and 104 between the 3-dB optical couplers 101 and 102 are formed to be equal with an accuracy better than 0.1 μm. In addition, on the cladding layer 111, two thin film heaters (of chromium film, for example), each of which is 50 μm wide and approximately 5 mm long, are formed as thermo-optical effect phase shifters 105 and 106, as shown in FIG. 28D.

The radius of curvature of the arc patterns of the optical waveguides of this embodiment is specified to 50 mm. The optical switch is 40 mm × 2.5 mm in size, and is fabricated by means of the known combination of the glass-film deposition technique using a flame-hydrolysis reaction and the micro-fabrication technique using reactive-ion etching.

In the present invention, it is essential to form the optical-path length difference λ0 between the two directional couplers constituting each 3-dB optical coupler 101 and 102 with a high degree of accuracy. It has been found by fabrication-experiments and computer-simulations that the error of λ0 should be limited to within ±0.1 μm. This can be easily achieved by the current photolithography technology.

The construction and coupling characteristics of the 3-dB optical couplers 101 and 102 will be explained in detail before describing the overall characteristics of the optical switch of the embodiment. The 3-dB optical couplers described below are fundamentally similar to the optical branching component described in the first embodiment.

Figure 29A:
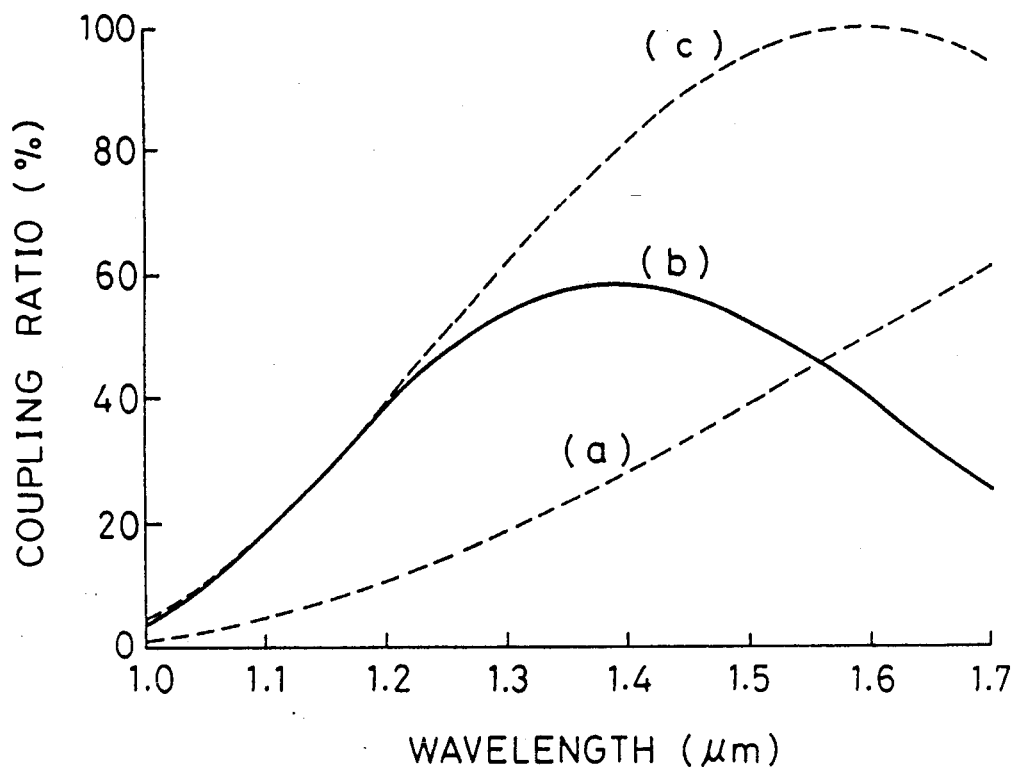
FIG. 29A is a graph showing the wavelength dependence of the coupling ratio of the guided-wave 3-dB optical couplers constituting the optical switch according to the fourteenth embodiment of the present invention.
Figure 29B:
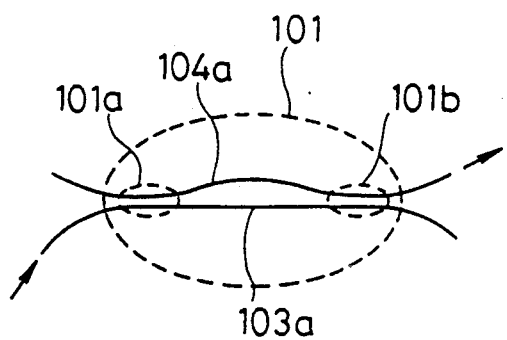
FIG. 29B is a view illustrating the 3-dB optical coupler.

FIG. 29A is a graph showing the coupling ratio versus wavelength of the Mach-Zehnder interferometer type 3-dB optical couplers 101 and 102 constituting the optical switch of the present invention. The coupling characteristics are obtained by measuring a test sample 3-dB optical coupler 101 shown in FIG. 29B, which is individually fabricated on a silicon substrate by forming directional couplers 101a and 101b together with the optical waveguides 104a and 103a in the same manner as the directional couplers 101 and 102 in FIG. 28A.

Curve (a) in FIG. 29A shows the wavelength dependence of the coupling ratio of the directional coupler 101a or 101b itself, the coupling region of which is constructed in such a way that the optical waveguides are separated by 4 μm, and the effective lengths of the optical waveguides in the coupling regions are $L1 = L2 = 0.3$ mm. The directional couplers in this embodiment are made identical to each other.

Curve (b) shows the wavelength dependence of the coupling ratio of the optical coupler 101 in its entirety when the optical-path length difference λ0 between the directional couplers 101a and 101b is set to 1.15 μm. It must be noted that considering that the refractive index of the silica-based optical waveguides 103a and 104a is approximately 1.45, the apparent optical-path length difference corresponding to λ0 = 1.15 μm is 0.79 μm (=1.15 μm/1.45).

Curve (c) shows the wavelength dependence of the overall coupling ratio of the two serially connected directional couplers 101a and 101b when λ0 is deliberately set to 0.0 μm. The coupling characteristics in this case corresponds to a directional coupler whose coupling length is (L1+L2).

Figure 6:
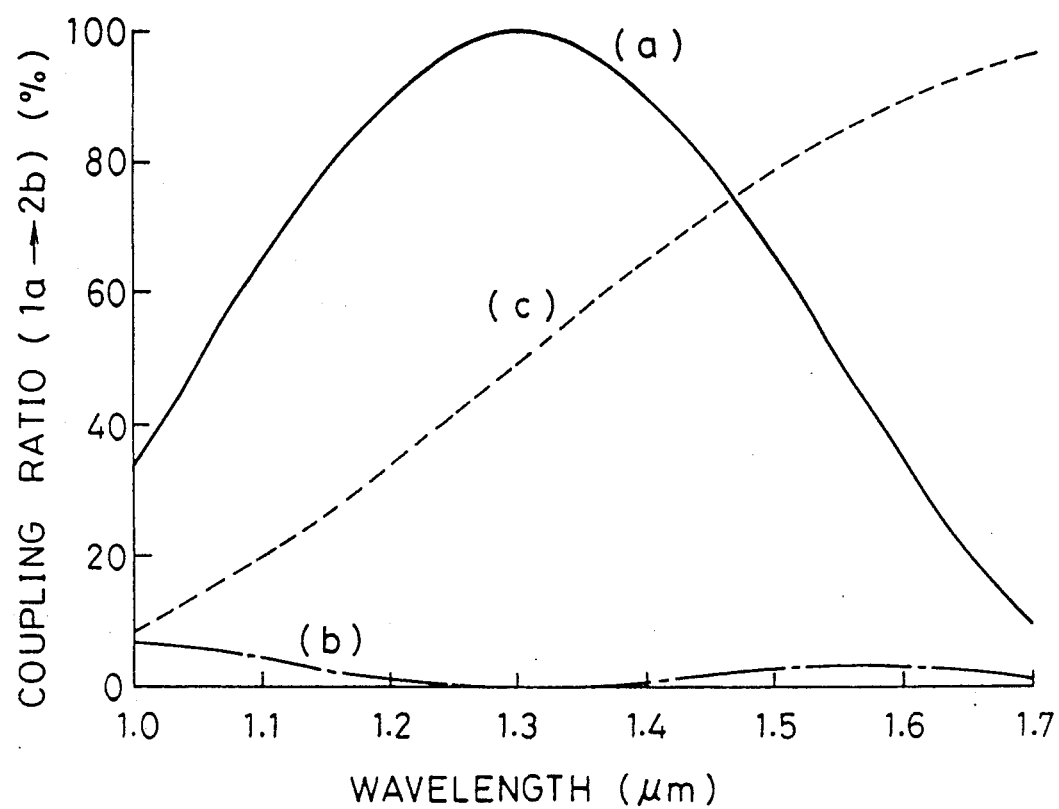
FIG. 6 is a graph showing the wavelength dependence of the conventional guided-wave optical switch.

The curve (b) shows that the coupling ratio of the entire optical coupler 101 is maintained within a range of about 50% ± 10% in a wavelength region of 1.22 to 1.60 μm when the optical-path length difference is appropriately determined (i.e., when λ0 = 1.15 μm). This fact is in sharp contrast with the fact that the coupling ratio of 50% ± 10% of the conventional optical switch is limited to a narrow range of 1.24 μm to 1.37 μm, as shown by the curve (c) in FIG. 6 depicting the optical coupling characteristics of the conventional optical switch.

Figure 30:
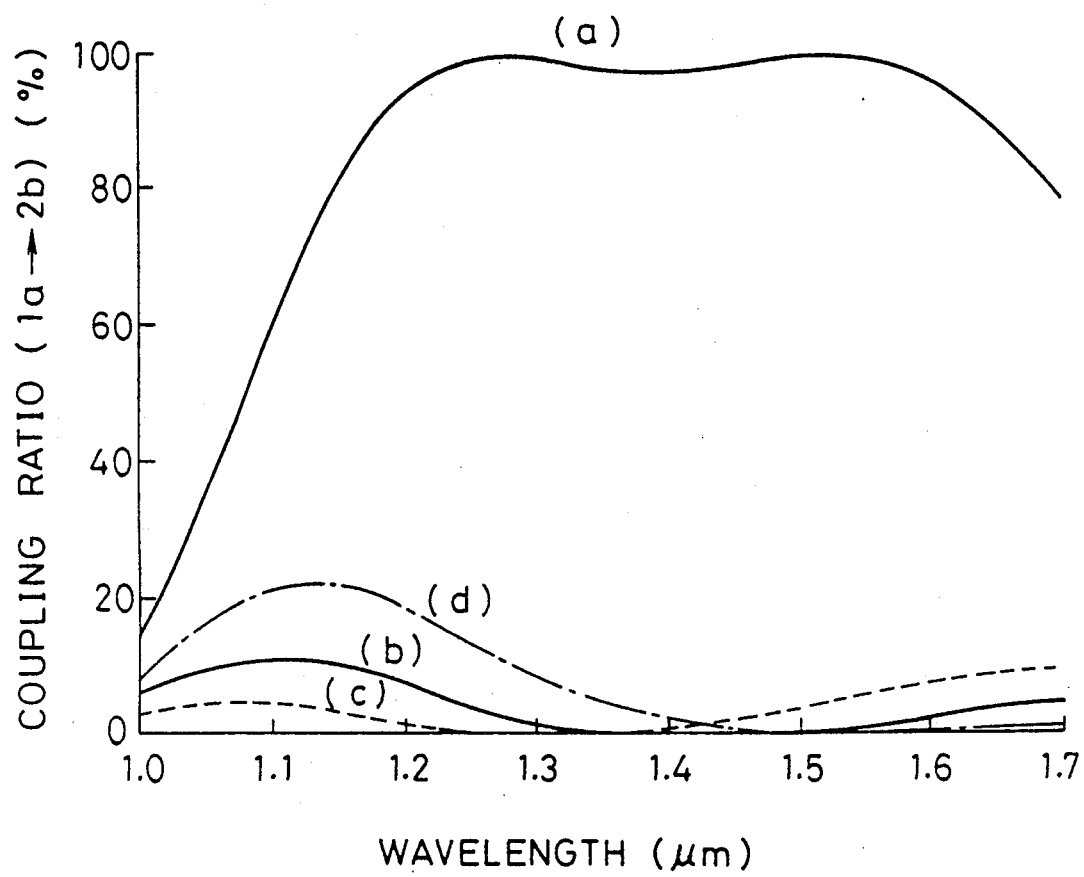
FIG. 30 is a graph showing the wavelength dependence of the coupling ratio of the optical switch according to the fourteenth embodiment of the present invention.

FIG. 30 is a graph showing the wavelength dependence of the coupling ratio of the optical switch in FIG. 28A according to the fourteenth embodiment of the present invention; the optical coupler, the characteristics of which are shown by the curve (b) in FIG. 29A, is used as 3-dB optical couplers 101 and 102.

The most important point in constructing the optical switch is the following: whereas in the 3-dB optical coupler 101, the optical waveguide 104a is longer than the optical waveguide 103a by λ0=1.15 μm, in the 3-dB optical coupler 102, the optical waveguide 103b is longer than the optical waveguide 104b by λ0=1.15 μm (This will be described in more detail later).

Curve (a) in FIG. 30 shows the wavelength dependence of the optical coupling ratio (107 to 110) when the optical switch is in the OFF state, that is, when the phase shifters 105 and 106 are in the OFF state. In the conventional optical switch, the wavelength region in which the coupling ratio is maintained above 90% is restricted to 1.20 μm to 1.40 μm. In contrast, in FIG. 30, the wavelength region in which the coupling ratio is above 90% is wide, from 1.20 to 1.61 μm, including not only 1.3 μm but also 1.55 μm.

Curve (b) in FIG. 30 shows the wavelength dependence of the coupling ratio (107 to 110) when one of the phase shifters (thin film heaters) is in the ON state: the optical-path length change corresponding to 0.71 μm long is produced in one of the optical waveguides with the change in refractive index by means of the thermo-optical effect (the power consumption of the thin film heater is about 0.5 W). The wavelength region in which the coupling ratio is below 5% is 1.24 to 1.70 μm. In this state, the optical signal is transmitted through the path 107 to 109. In short, the optical switch of the present invention can function as an optical switch having coupling ratio which is either above 90% or below 5% at the wavelengths of 1.3 μm and 1.55 μm simultaneously. Thus, the optical switch of the present invention solves the disadvantages of the conventional optical switches.

The coupling ratio (107 to 110) shown by the curve (b) in FIG. 30 is about 2% at the wavelength of 1.3 μm. The coupling ratio, however, can be further reduced so that the optical signal of nearly 100% can be transmitted through the path (107 to 109). To accomplish this, the optical-path length change by the phase shifter should be controlled to 0.65 μm (=1.3 μm/2) so that the optimum value is achieved at the wavelength of 1.3 μm. This corresponds to the curve (c) in FIG. 30. This is achieved, however, at the cost of about 6% increase in the coupling ratio at the wavelength of 1.55 μm.

Curve (d) in FIG. 30 shows an example wherein the switching function at the wavelength of 1.55 μm is improved at the sacrifice of the performance at the wavelength of 1.3 μm. The curve (b) corresponds to the middle of the curves (c) and (d) in which the optical-path length difference at the wavelength 1.42 μm is adjusted to the optimum value of 0.71 μm (=1.42 μm/2) so that the switching functions at the wavelength of 1.3 μm and 1.55 μm are compatible. These characteristics shown by the curves (b), (c) and (d) can be selected according to the desired purpose.

EMBODIMENT 15

Figure 31A:
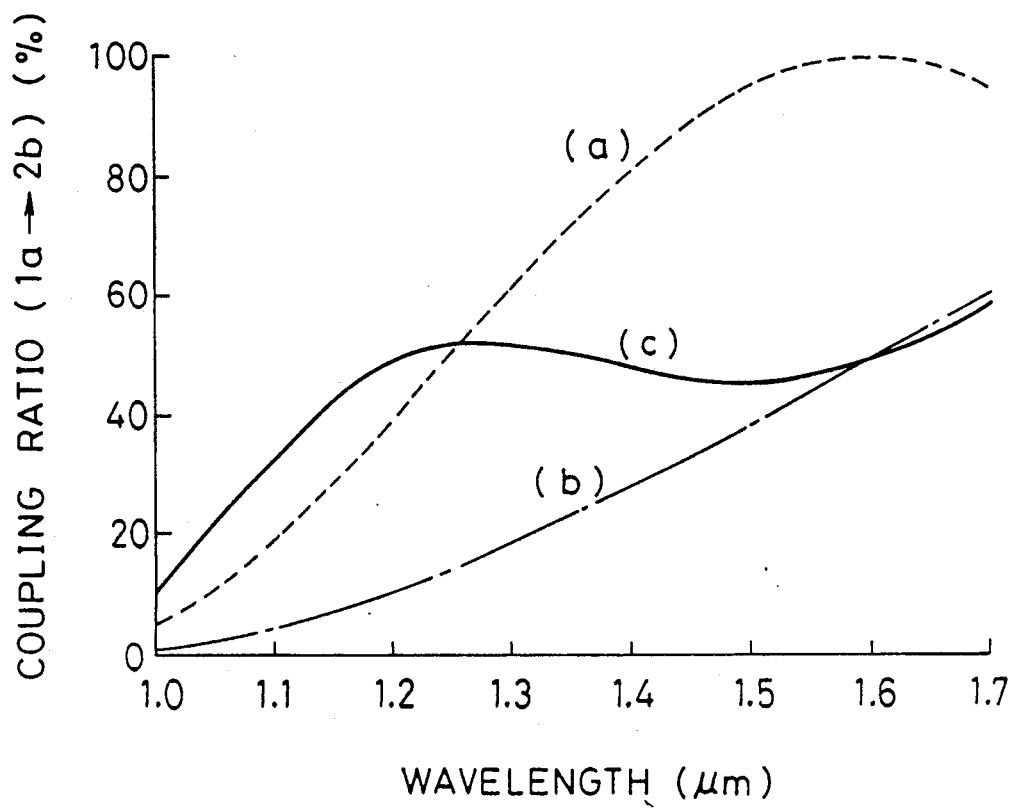
FIG. 31A is a graph showing the wavelength dependence of the coupling ratio of the guided-wave 3-dB optical couplers constituting the optical switch according to the fifteenth embodiment of the present invention.
Figure 31B:
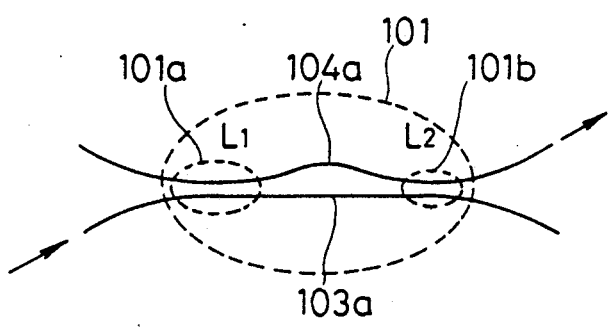
FIG. 31B is a view illustrating the 3-dB optical coupler.

FIG. 31A is a graph illustrating the coupling ratios versus wavelengths of the 3-dB optical couplers constituting the optical switch according to the fifteenth embodiment of the present invention. The 3-dB optical couplers of this embodiment differ from those of the above embodiment 14 in that they have different directional couplers 101a and 101b as shown in FIG. 31B: the coupling length of the directional coupler 101a is set to L1=0.6 mm, whereas that of the directional coupler 101b is set to L2=0.3 mm; the former is twice as long as the latter. The optical-path length difference between the directional couplers is set to λ0=0.95 μm. In FIG. 31A, curve (a) shows the coupling characteristics of the directional coupler 101a, curve (b) shows the coupling characteristics of the directional coupler 101b, and curve (c) shows the coupling characteristics of the 3-dB optical coupler 101 in its entirety. The wavelength dependence of the coupling ratio of the 3-dB optical coupler 101 is reduced in comparison with that shown by the curve (b) in FIG. 29A of embodiment 14: the wavelengths at which the coupling ratio takes a value of 50%±5% range very widely from 1.17 μm to 1.66 μm.

Figure 32:
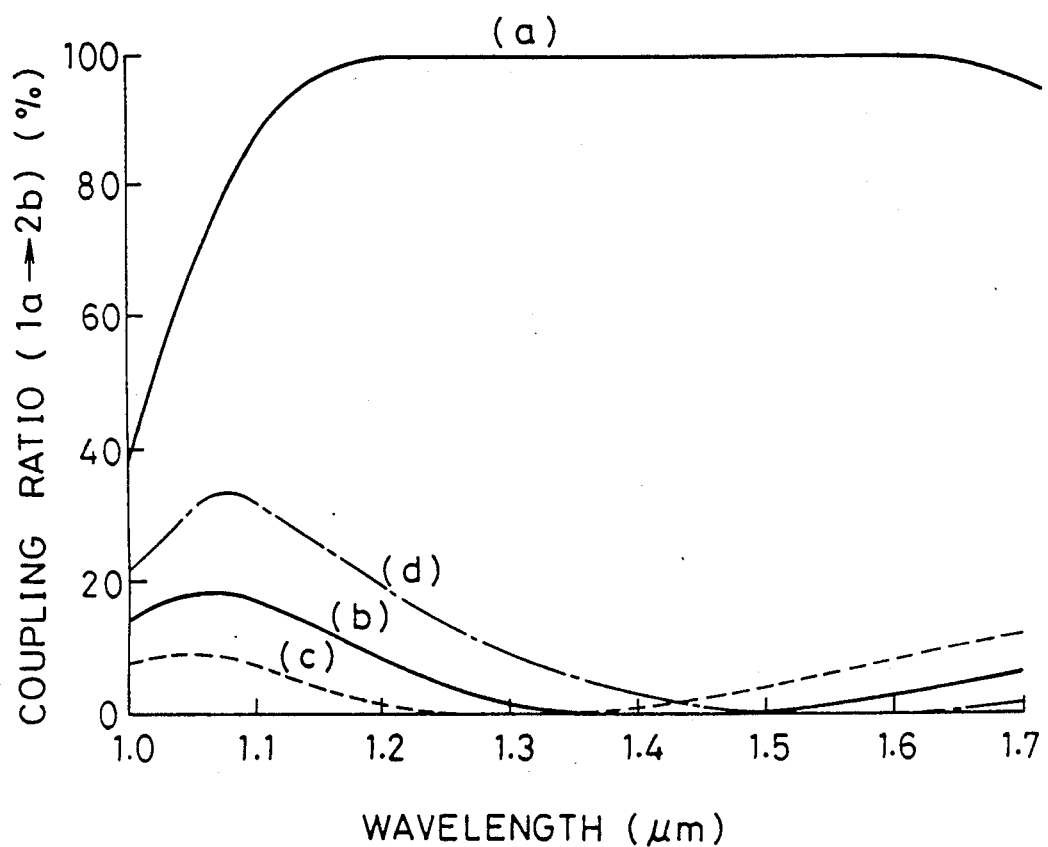
FIG. 32 is a graph showing the wavelength dependence of the coupling ratio of the optical switch according to the fifteenth embodiment of the present invention.

FIG. 32 is a graph showing the wavelength dependence of the coupling ratio of the optical switch according to the fifteenth embodiment of the present invention: the optical switch is constructed by arranging the two 3-dB optical couplers shown in FIG. 31A in a manner similar to those in FIG. 28. The important feature is the inner structure of the 3-dB optical coupler 102: the coupling length of the directional coupler 102a of the 3-dB optical coupler 102 is made equal to that of the directional coupler 101b, and the coupling length of the directional coupler 102b of the 3-dB optical coupler 102 is made equal to that of the directional coupler 101a. Furthermore, it must be pointed out that the optical-path length difference between the directional couplers 102a and 102b is provided in such a way that the optical waveguide 103 is longer than optical waveguide 104 between the directional couplers 102a and 102b.

In FIG. 32, curve (a) shows the characteristics of the coupling ratio (107 to 110) when the phase shifter of the optical switch is in the OFF state. The wavelength region in which the coupling ratio is above 90% is further extended from 1.11 μm to 1.75 μm in comparison with that of the embodiment 14. Curves (b), (c), and (d) show the characteristics of the coupling ratios when the optical switch is made ON by providing one of the two phase shifters with the changes corresponding to the optical-path length differences of (b)=0.71 μm, (c)=0.65 μm, and (d)=0.775 μm, respectively. This shows that the optical switch of this embodiment achieves a function similar to that of the embodiment 14, and proves the operation as a wide wavelength optical switch.

The above was the description of construction and operation of the two embodiments of the optical switches of the present invention. The optical switch of the present invention, however, is not limited to this construction.

FIGS. 33A–33D are views for considering possible variations of the optical switches of the present invention. In the explanations below, it is assumed that the two types of directional couplers used in embodiment 15, the coupling lengths of which are L1 and L2, respectively, are also used, and that the optical-path length difference between the two directional couplers is set to λ0=0.95 μm.

Figure 33A:
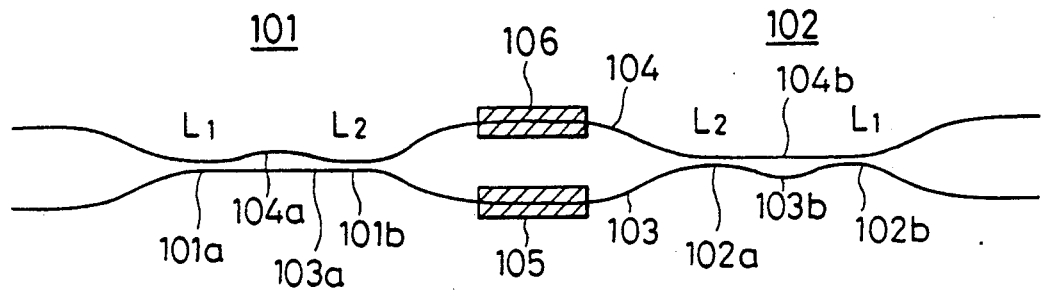
FIGS. 33A-33D are views of possible configurations of variations of the optical switches of the present invention.

FIG. 33A shows the construction identical to that of embodiment 15, which has preferable characteristics as an optical switch of the present invention.

Figure 33B:
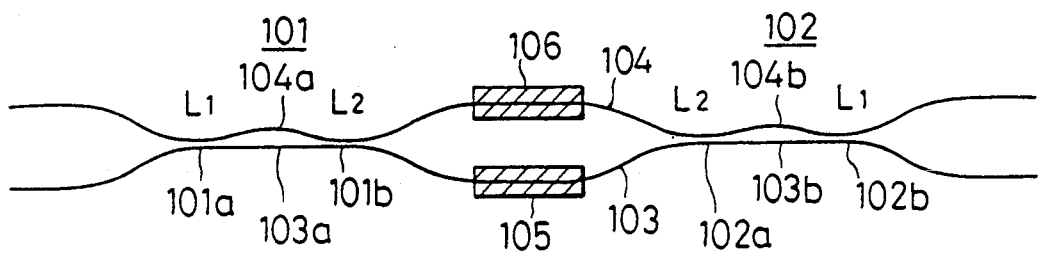

FIG. 33B shows an example by contrast with the embodiment in FIG. 33A, wherein the optical waveguide 104b is made longer than the optical waveguide 103b in the 3-dB optical coupler 102 so as to provide the optical-path length difference. This configuration, however, cannot achieve the preferable switching operation of little wavelength dependence.

Figure 33C:
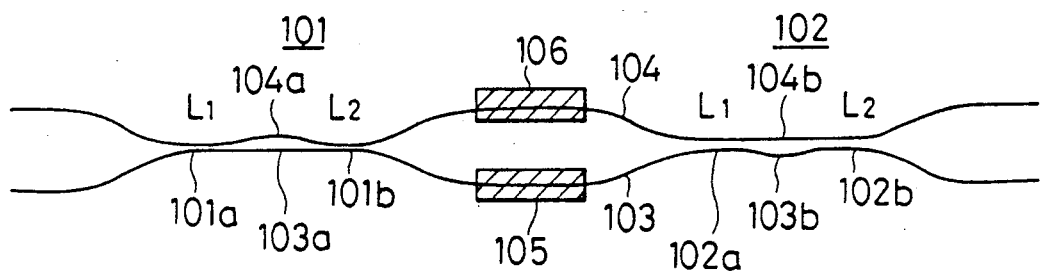

FIG. 33C shows an example wherein the coupling lengths L1 and L2 of the directional couplers 102a and 102b in the 3-dB optical coupler 102 are exchanged with regard to those in FIG. 33A. This configuration cannot produce a preferable result, either.

Figure 33D:
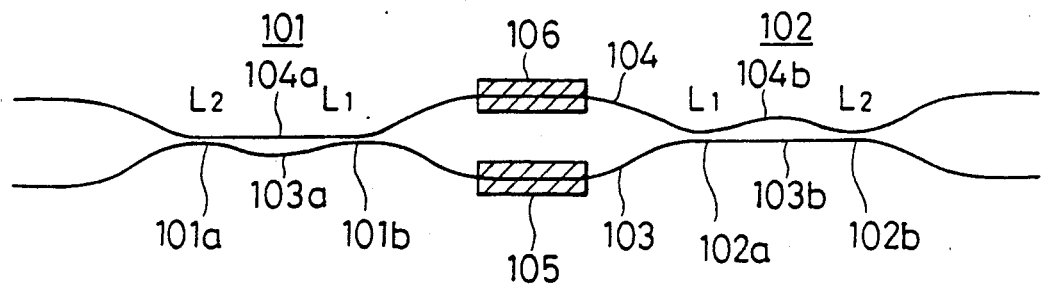

FIG. 33D shows a further example wherein the coupling lengths L1 and L2 of the directional couplers 101a and 101b, and 102a and 102b in both 3 dB optical couplers 101 and 102 are exchanged with regard to those of the embodiment in FIG. 33A, and in addition, the optical waveguides 103a and 104b are made longer, opposite to those of the embodiment in FIG. 33A, so as to provide respective optical-path length differences of the 3-dB optical couplers 101 and 102. This results in as good an operation as in the configuration in FIG. 33A.

Above experiments suggest that the constituents of the optical switches of the present invention be arranged substantially optically symmetrical to the central point. The details must be determined by performing individual simulations according to wave-coupling theory.

In the preceding embodiments, the optical-path lengths between the two 3-dB optical couplers are identical when the phase shifters are in the OFF state. This setting, however, can be changed so that the ON/OFF state in FIGS. 30 or 32 is inverted: the optical-path length difference of about 0.71 $\mu$m is initially given between the two 3-dB optical couplers; and then the optical-path length difference is canceled by turning the phase shifter ON. This type of optical switch is also contemplated by the present invention.

The above is a description of the optical-path switching function of optical switch of the present invention. Functions of the optical switch of the present invention, however, are not restricted to the simple switching of the optical path. For example, the optical switch of the present invention can be operated as a variable optical coupler by providing an optical-path length variation of about 0.2 $\mu$m by means of the phase shifters.

The construction and operation of the present invention have been described by exemplifying devices using silica-based optical waveguides formed on a silicon substrate. The present invention, however, is not limited to this material; any other materials that can be used to construct directional couplers and phase shifters can be employed. For example, LiNbO$_3$-based optical waveguides and electro-optical effect phase shifters can be used.

Furthermore, the coupling length of each directional coupler in the preceding embodiments will be slightly changed in response to peculiarities of the fabrication processes, and hence, these parameters should be appropriately adjusted without being restricted to the above numerical examples, so that directional couplers can be achieved, the wavelength dependencies of which are similar to those shown by the curves (a) and (b) in FIG. 29A or FIG. 31A.

The guided-wave optical branching components of the present invention are expected to be widely used for distributing, monitoring or tapping optical signals in a wide wavelength region. In addition, the optical branching components of the present invention are expected to be used as optical combiners for multiplexing two or three optical beams.

Furthermore, the optical branching component of the present invention can be easily extended to a 4-branching component, an 8-branching component, a 9- or a 27-branching component by connecting the optical branching components of the present invention to form a multi-stage configuration on a planar substrate. Moreover, the optical branching components deposited on a single substrate in the form of array can be connected to an optical fiber array of 250 $\mu$m pitch so as to be put in practical use.

The optical branching components of the present invention can be fabricated in a large quantity on a planar substrate, which reduces the cost of the optical branching components. As a result, the optical branching components of the present invention and their application components are expected to greatly contribute to the spread of optical communication systems.

Furthermore, the optical switches of the present invention are also expected to greatly contribute to the architecture of an optical fiber communication network in which a number of optical signals of different wavelengths are multiplexed.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A guided-wave optical branching component having two or more optical waveguides, said optical waveguides being in proximity with one another at a plurality of positions so as to constitute a plurality of directional couplers, one end of each said optical waveguides being an input port and the other end of each said optical waveguides being an output port, wherein the effective optical-path length of at least one of said optical waveguides differs from that of the other optical waveguides between two arbitrarily selected adjacent directional couplers, the difference of said effective optical-path length being less than the shortest wavelength in the operational wavelength region of said guided-wave optical branching component, the coupling ratio of each of said two adjacent directional couplers monotonically increases according to the wavelength in said operational wavelength region.

2. A guided-wave optical branching component according to claim 1 wherein said two or more optical waveguides are placed on a substrate.

3. A guided-wave optical branching component according to claim 1 wherein said two or more optical waveguides are composed of optical fibers.

4. A guided-wave optical branching component according to claim 1 wherein said guided-wave optical branching component is provided with two input ports and two output ports.

5. A guided-wave optical branching component according to claim 1 wherein said guided-wave optical branching component is provided with three input ports and three output ports.

6. A guided-wave optical branching component according to claim wherein said coupling ratios of said two adjacent directional couplers are set different from each other.

7. A guided-wave optical branching component according to claim 2 wherein said coupling ratios of said two adjacent directional couplers are set different from each other.

8. A guided-wave optical branching component according to claim 3 wherein said coupling ratios of said two adjacent directional couplers are set different from each other.

9. A guided-wave optical branching component according to claim 4 wherein said coupling ratios of said two adjacent directional couplers are set different from each other.

10. A guided-wave optical branching component according to claim 5 wherein said coupling ratios of said two adjacent directional couplers are set different from each other.

11. A guided-wave optical branching component according to claim 1 wherein said guided-wave optical branching component comprises an optical phase shifter for fine adjusting the effective optical-path length between said adjacent directional couplers, said optical phase shifter being placed on at least one of said two or more optical waveguides connecting said adjacent directional couplers.

12. A guided-wave optical branching component according to claim 2 wherein said guided-wave optical branching component comprises an optical phase shifter for fine adjusting the effective optical-path length between said adjacent directional couplers, said optical phase shifter being placed on at least one of said two or more optical waveguides connecting said adjacent directional couplers.

13. A guided-wave optical switch having two optical waveguides, primary and secondary 3-dB optical coupling members, and an optical phase shifter, each of said primary and secondary 3-dB optical coupling members coupling said two optical waveguides at different positions, said optical phase shifter being placed on said optical waveguides between said primary and secondary 3-dB optical coupling members so as to fine adjust the optical-path length of said optical waveguides, wherein:
each of said primary and secondary 3-dB optical coupling members has two directional couplers formed by bringing said two optical waveguides into close proximity at different positions;
the effective optical-path length of one of said optical waveguides differs from that of the other optical waveguide between said two directional couplers, the difference of said effective optical-path length is less than the shortest wavelength in the predetermined operational wavelength region and the coupling ratio of each of said two directional couplers monotonically increases with wavelength in said operational wavelength region; and
the optical waveguide having a longer optical-path length in the primary 3-dB optical coupling member, and the optical waveguide having a longer optical-path length in the secondary 3-dB optical coupling member are different optical waveguides.

14. A guided-wave optical switch according to claim 13 wherein said two optical waveguides are placed on a substrate.

15. A guided-wave optical switch according to claim 13 wherein said two optical waveguides are composed of optical fibers.

16. A guided-wave optical switch according to claim 13 wherein said coupling ratios of said two directional couplers are set different from each other, and the coupling region of said primary 3-dB optical coupling member and the coupling region of said secondary 3-dB optical coupling member are arranged substantially symmetrically with regard to the central point between said two 3-dB optical coupling members.

17. A guided-wave optical branching component according to claim 14 wherein said coupling ratios of said two directional couplers are set different from each other, and the coupling region of said primary 3-dB optical coupling member and the coupling region of said secondary 3-dB optical coupling member are arranged substantially symmetrically with regard to the central point between said two 3-dB optical coupling members.

18. A guided-wave optical branching component according to claim 15 wherein said coupling ratios of said two directional couplers are set different from each other, and the coupling region of said primary 3-dB optical coupling member and the coupling region of said secondary 3-dB optical coupling member are arranged substantially symmetrically with regard to the central point between said two 3-dB optical coupling members.

* * * * *